US008479048B2

(12) United States Patent
Morimura et al.

(10) Patent No.: US 8,479,048 B2
(45) Date of Patent: *Jul. 2, 2013

(54) ROOT CAUSE ANALYSIS METHOD, APPARATUS, AND PROGRAM FOR IT APPARATUSES FROM WHICH EVENT INFORMATION IS NOT OBTAINED

(75) Inventors: Tomohiro Morimura, Kawasaki (JP);
Takayuki Nagai, Machida (JP);
Kiminori Sugauchi, Yokohama (JP);
Takaki Kuroda, Machida (JP);
Yoshihiro Arato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,694

(22) Filed: Aug. 17, 2011

(65) Prior Publication Data

US 2011/0302305 A1    Dec. 8, 2011

Related U.S. Application Data

(63) Continuation of application No. 12/444,398, filed as application No. PCT/JP2009/000285 on Jan. 26, 2009, now Pat. No. 8,020,045.

(30) Foreign Application Priority Data

Sep. 30, 2008  (JP) .................. 2008-252093

(51) Int. Cl.
*G06F 11/00* (2006.01)
(52) U.S. Cl.
USPC ............... 714/26; 714/51; 714/55; 714/735; 714/736; 714/742; 714/25; 709/201; 709/202; 709/203

(58) Field of Classification Search
USPC .. 714/51, 55, 735, 736, 742, 25, 26; 709/201, 709/202, 203
See application file for complete search history.

(56) References Cited

U.S. PATENT DOCUMENTS 5,848,143 A * 12/1998 Andrews et al. .......... 379/265.09
6,023,507 A *  2/2000 Wookey ...................... 709/224
(Continued)

FOREIGN PATENT DOCUMENTS

JP    11-259331     9/1999
JP    2004-348640   12/2004
(Continued)

OTHER PUBLICATIONS

Forgy, Rete: A Fast Algorithm for the Many Pattern/Many Object Pattern Match Problem*, Artificial Intelligence 19 (1982) pp. 17-37.

*Primary Examiner* — Scott T Baderman
*Assistant Examiner* — Jeison C Arcos
(74) *Attorney, Agent, or Firm* — Mattingly & Malur, PC

(57) ABSTRACT

In the system management server, an information processing apparatus that is an event-information acquisition target is registered as a monitored apparatus in configuration information; event information that complies with a rule stored in advance is identified from among a plurality of pieces of event information stored in the system management server; a server apparatus for a network service related to the event information is identified; and a message is displayed which indicates that the cause of the event that occurred in a client information processing apparatus which has generated event information is an event related to the network service, which occurred in the server apparatus.

21 Claims, 12 Drawing Sheets

U.S. PATENT DOCUMENTS

| | | | |
|---|---|---|---|
| 6,249,755 B1 | 6/2001 | Yemini et al. | |
| 6,393,386 B1 | 5/2002 | Zager et al. | |
| 6,393,474 B1 | 5/2002 | Eichert et al. | |
| 6,654,782 B1 | 11/2003 | O'Brien et al. | |
| 6,678,835 B1 | 1/2004 | Shah et al. | |
| 6,820,042 B1 | 11/2004 | Cohen et al. | |
| 6,823,299 B1 | 11/2004 | Contreras et al. | |
| 6,829,639 B1 | 12/2004 | Lawson et al. | |
| 6,854,069 B2 | 2/2005 | Kampe et al. | |
| 6,941,247 B2 * | 9/2005 | Voigt et al. | 702/188 |
| 6,968,291 B1 | 11/2005 | Desai | |
| 7,028,228 B1 | 4/2006 | Lovy et al. | |
| 7,069,480 B1 | 6/2006 | Lovy et al. | |
| 7,080,143 B2 | 7/2006 | Hunt et al. | |
| 7,277,783 B2 * | 10/2007 | Predelli | 701/48 |
| 2001/0016789 A1 * | 8/2001 | Staiger | 701/1 |
| 2002/0100017 A1 * | 7/2002 | Grier et al. | 717/120 |
| 2003/0014644 A1 | 1/2003 | Burns et al. | |
| 2003/0046615 A1 | 3/2003 | Stone | |
| 2003/0105537 A1 * | 6/2003 | Crispin et al. | 700/20 |
| 2003/0149919 A1 * | 8/2003 | Greenwald et al. | 714/43 |
| 2003/0214908 A1 | 11/2003 | Kumar et al. | |
| 2004/0088140 A1 * | 5/2004 | O'Konski et al. | 702/183 |
| 2004/0225381 A1 * | 11/2004 | Ritz et al. | 700/26 |
| 2005/0086502 A1 | 4/2005 | Rayes et al. | |
| 2005/0188268 A1 * | 8/2005 | Verbowski et al. | 714/37 |
| 2005/0234824 A1 * | 10/2005 | Gill et al. | 705/50 |
| 2006/0048017 A1 | 3/2006 | Anerousis et al. | |
| 2006/0230122 A1 | 10/2006 | Sutou et al. | |
| 2007/0150480 A1 * | 6/2007 | Hwang et al. | 707/10 |
| 2009/0028053 A1 * | 1/2009 | Kannan et al. | 370/241 |

FOREIGN PATENT DOCUMENTS

| | | |
|---|---|---|
| JP | 2005-316728 | 11/2005 |
| JP | 2006-133983 | 5/2006 |
| JP | 2006-338305 | 12/2006 |
| JP | 2007-334716 | 12/2007 |

* cited by examiner

FIG. 4

(1) RCA RULE FOR FAULT IN STORAGE CONTROLLER (IP-SAN)

```
Rule-ID: R1
IF
  <Computer.has(iScsiInitiator) LogicalDisk_ERR>
  <IpSwitch>
  <Storage.has(iScsiTarget) Controller_ERR>
THEN
  <Storage.has(iScsiTarget) RootCause(Controller_ERR) >
```
~ R1

(2) RCA RULE FOR FAULT IN STORAGE CONTROLLER (FC-SAN)

```
Rule-ID: R2
IF
  <Computer.has(FcHba) LogicalDisk_ERR>
  <IpSwitch>
  <Storage.has(FcPort) Controller_ERR>
THEN
  <Storage.has(FcPort) RootCause(Controller_ERR) >
```
~ R2

(3) RCA RULE FOR NIC FAULT IN FILE SERVER

```
Rule-ID: R3
IF
  <Computer.is(ImportedFileShare) LogicalDisk_ERR>
  <IpSwitch>
  <Computer.is(ExportedFileShare) NIC_ERR>
THEN
  <Computer(ExportedFileShare) RootCause(NIC_ERR) >
```
~ R3

(4) RCA RULE FOR NETWORK UNREACHABLE FAULT IN DNS SERVER

```
Rule-ID: R4
IF
  <Computer Network_ERR>
  <Computer(DNSService) Unreachable_ERR>
THEN
  <Computer(DNSService) RootCause(Unreachable_ERR) >
```
~ R4

FIG. 5
(1) IP-SAN TOPOLOGY INDICATED BY RULE R1
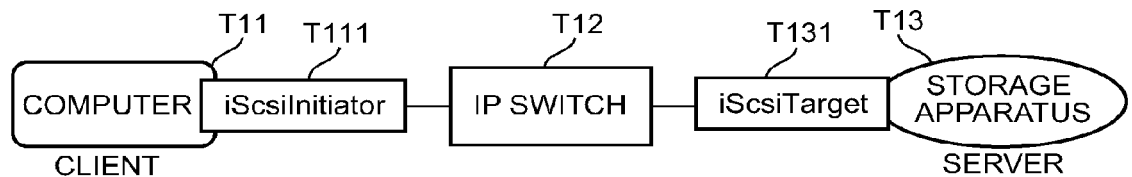
(2) FC-SAN TOPOLOGY INDICATED BY RULE R2
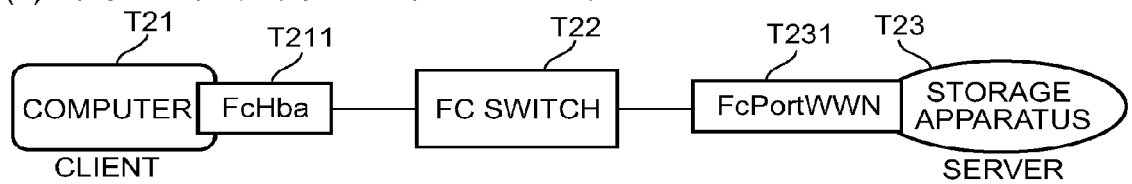
(3) TOPOLOGY OF FILE SERVER AND CLIENT INDICATED BY RULE R3
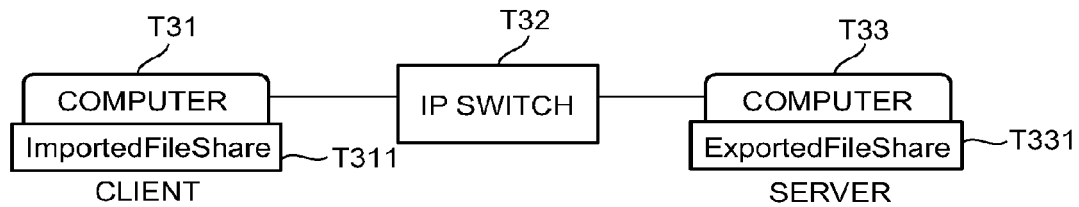
(4) TOPOLOGY OF NFS SERVER INDICATED BY RULE R4
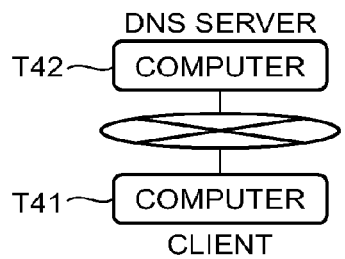
FIG. 6
| RULE | LIST OF APPLICATION-DESTINATION IT APPARATUSES |
|---|---|
| R1 | N10, N40 |
| R1 | N11, N40 |
| R2 | N13, N41 |
| R3 | N11, N12 |
| ⋮ | ⋮ |

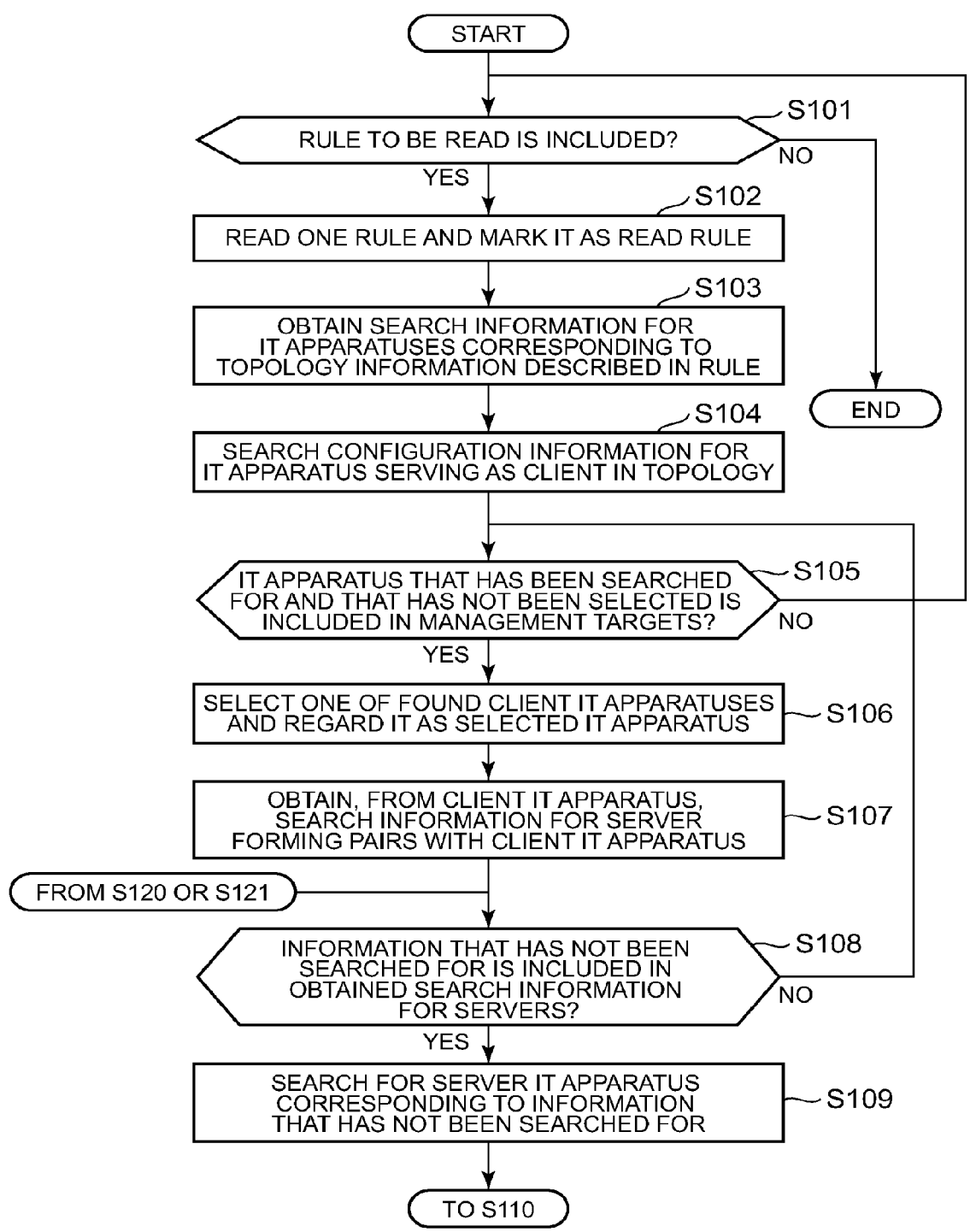

FIG. 8

| COMPUTER (C201) | ConnectedIscsiTarget (C202) |
|---|---|
| N10 | iqn.1994-04.com. domain2:sos.df700.t.com.domain2.10966.0b027 |
| N10 | iqn.1994-04.com. domain:sos.df700.t.com.domain.10966.0b055 |
| N11 | iqn.1994-04.com. domain:sos.df700.t.com.domain.10966.0b055 |
| ⋮ | ⋮ |

| STORAGE (C301) | IscsiTarget (C302) |
|---|---|
| N40 | iqn.1994-04.com.domain:sos.df700.t.com.domain.10966.0b055 |

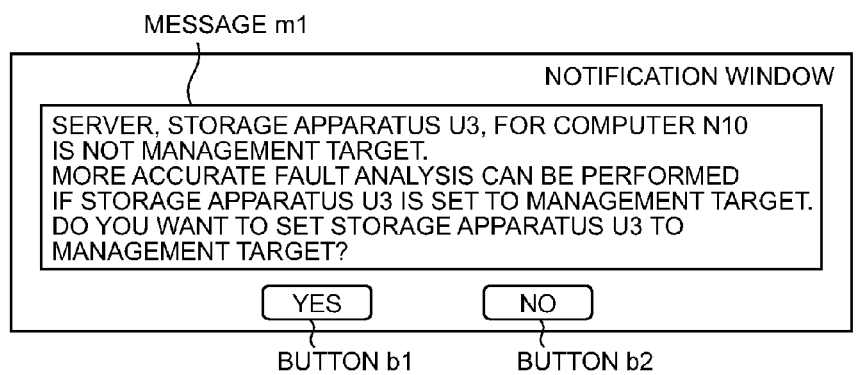

NOTIFICATION WINDOW

MESSAGE m1:
SERVER, STORAGE APPARATUS U3, FOR COMPUTER N10 IS NOT MANAGEMENT TARGET.
MORE ACCURATE FAULT ANALYSIS CAN BE PERFORMED IF STORAGE APPARATUS U3 IS SET TO MANAGEMENT TARGET.
DO YOU WANT TO SET STORAGE APPARATUS U3 TO MANAGEMENT TARGET?

BUTTON b1: YES    BUTTON b2: NO

FIG. 11

| ID (C401) | TYPE | NODE IDENTIFIER (C402) | SERVICE IDENTIFICATION INFORMATION (C403) |
|---|---|---|---|
| U1 | IP-SAN StorageU2 | 192.168.100.15 | iqn.1994-04.com.domain2:sos.df700.t.com.domain1.10966.0b027 |
| U2 | FC-SAN Storage | 192.168.10.16 | 50:06:0E:85:10:03:4D:01 |
| U3 | File Server | exportfs.domain2.com | export_01 |
| U4 | DNS Server | 192.168.100.1 | — |
| ⋮ | ⋮ | ⋮ | ⋮ |

| | RULE (C101) | LIST OF APPLICATION-DESTINATION IT APPARATUSES (C102) |
|---|---|---|
| L101 | R1 | N10, N40 |
| L102 | R1 | N11, N40 |
| L103 | R2 | N13, N41 |
| L104 | R3 | N11, N12 |
| L105 | R1 | N10, U1 |
| L106 | R2 | N13, U2 |
| L107 | R3 | N10, U3 |
| L108 | R3 | N11, U5 |
| L109 | R4 | N10, U4 |
| L110 | R4 | N11, U4 |
| | ⋮ | ⋮ |

| | COMPUTER (C501) | ConnectedFcPortWWN (C502) |
|---|---|---|
| L501 | N13 | 50:06:0E:85:10:03:4D:01 |
| L502 | N13 | 50:06:0E:85:10:03:4D:02 |
| | ⋮ | ⋮ |

| | STORAGE (C601) | FcPortWWN (C602) |
|---|---|---|
| L601 | N41 | 50:06:0E:85:10:03:4D:02 |

TL6

| | C10 | C11 | C12 |
|---|---|---|---|
| TL7 | COMPUTER | FILE-SERVER IDENTIFICATION INFORMATION | PUBLIC NAME |
| L701 | N10 | exportfs.domain2.com | export_01 |
| L702 | N11 | N12 | share_docs |
| L703 | N11 | 192.168.10.15 | /export/home |
| | ⋮ | ⋮ | ⋮ |

ROOT CAUSE ANALYSIS METHOD, APPARATUS, AND PROGRAM FOR IT APPARATUSES FROM WHICH EVENT INFORMATION IS NOT OBTAINED

CLAIM OF PRIORITY

The present application claims priority from Japanese application 2008-252093 filed on Sep. 30, 2008 and is a continuation application of U.S. application Ser. No. 12/444, 398, filed Apr. 6, 2009, now U.S. Pat. No. 8,020,045 which is a 371 application of PCT/JP2009/000285, filed Jan. 26, 2009, the contents of which are hereby incorporated by reference into this application.

TECHNICAL FIELD

A technology disclosed in this specification relates to a system management method, an apparatus, a system, and a program for managing an operation of an information processing system which includes a server computer, a network apparatus, and a storage apparatus, and to a medium that includes the program, and an apparatus for delivering the program.

BACKGROUND ART

Recent years, each IT system (IT is an abbreviation for Information Technology, and hereinafter, an IT system is also referred to as an information processing system) has become complex and large-scaled because various IT apparatuses (hereinafter, also referred to as information processing apparatuses) are coupled thereto via a network. Faults may affect the various IT apparatuses via the network. As an example of root cause analysis technologies of identifying the locations and causes of the faults, Patent Document 1 discloses an event correlation technology of analyzing a fault location and a cause by using event information used by an IT apparatus to notify fault contents. The event correlation technology is also called a technology of estimating a root cause by using the correlation of events sent from computers when faults occur. Non-Patent Document 2 discloses a technology in which a rule is made from a combination of the technology disclosed in Patent Document 1 and events occurring at the time of faults, and an estimated root cause, handled as a pair, thereby quickly determining a root cause by using an inference engine made based on an expert system.
[Patent Citation 1] U.S. Pat. No. 6,249,755 Specification
[Non Patent Citation 1] "Rete: A Fast Algorithm for the Many Pattern/Many Object Pattern Match Problem", ARTIFICIAL INTELLIGENCE, Vol. 19, no. 1, 1982, pp. 17-37.

DISCLOSURE OF INVENTION

Technical Problem

Since a system management server that performs processing required for operation management cannot obtain events of all IT apparatuses coupled to the network, the system management server limits the number of IT apparatuses from which event information is received (or obtained) and displays an analysis result by using a root cause analysis technology.

However, in the analysis technology, it is premised that event information can be obtained from all IT apparatuses coupled to the network. As a result, when an event (for example, a fault) occurs in an IT apparatus from which the system management server does not obtain event information, and an IT apparatus from which the system management server obtains event information is affected by this fault, since the IT apparatus in which the fault has occurred is not an analysis target, a rule is not applied thereto and the root cause of the fault cannot be identified.

Technical Solution

The present invention provides an apparatus, a system, a method, a program, and a storage medium which are related to analysis of events occurring in a plurality of information processing apparatuses in an information processing system that includes the plurality of information processing apparatuses, a screen output apparatus, and a system management server which has a processor and a memory.

According to an embodiment of the present invention, the system management server stores identification information of a server apparatus which is included in the plurality of information processing apparatuses and which is an access target of each of the plurality of information processing apparatuses for using a network service as a client, in configuration information held by the memory; registers a plurality of monitored apparatuses which are included in the plurality of information processing apparatuses and from which the system management server obtains event information, in the configuration information held by the memory; stores in the memory, a correlation analysis rule information, indicating that; when an event that includes a first event type related to the network service and an event that includes a second event type being different from the first event type related to the network service, both occurring in the plurality of information processing apparatuses, are detected, an event corresponding to the first event type can occur due to an event corresponding to the second event type; stores in the memory, a plurality of the event information obtained from the plurality of monitored apparatuses; identifies first event information which includes the first event type from among the plurality of the event information stored in the memory, based on the correlation analysis rule information; identifies a first monitored apparatus which is one of monitored apparatuses that sends the first event information and, a fault cause apparatus which serves as a server apparatus of the network service for the first monitored apparatus corresponding to the first event type, based on the configuration information; and sends information identifying the first monitored apparatus, the first event type, the fault cause apparatus, and the second event type to the screen output apparatus in case that the fault cause apparatus is not included in the plurality of monitored apparatuses, based on the correlation analysis rule information and the configuration information, thereby causing the screen output apparatus to display a message indicating that an event corresponding to the first event information that occurred in the first monitored apparatus is estimated to be caused by the fact that an event of the second event type occurred in the fault cause apparatus.

Note that the correlation analysis rule information may include topology condition information indicating a topology condition between a first information processing apparatus which is one of the plurality of information processing apparatuses and in which the first event type is occurred and a second information processing apparatus which is one of the plurality of information processing apparatuses and in which the second event type is occurred; and the fault cause apparatus may be identified based on the topology condition information in the cause identifying step.

Further, an event-related information processing apparatus which is a server apparatus for the plurality of monitored apparatuses and which is included in the plurality of information processing apparatuses but is not included in the plurality of monitored apparatuses, may be identified based on the correlation analysis rule information and the configuration information; whether event information can be obtained from the event-related information processing apparatus may be checked; and information identifying the event-related information processing apparatus may be sent to the screen output apparatus, based on a result of the checking, when event information can be obtained from the event-related information processing apparatus; thereby information indicating that event information can be obtained from the event-related information processing apparatus may be displayed on the screen output apparatus.

Further, the event-information acquisition permission/inhibition checking may be performed based on a result of an access by the system management server, according to a predetermined procedure to an information processing apparatus that is included in the plurality of information processing apparatuses and that has an IP address included in an IP address range specified in advance as a checking range.

Further, the fault cause apparatus may be a storage apparatus which has a controller and provides a logical volume; the network service may be a service providing the logical volume by a block access protocol; and the first event type may be the occurrence of a fault in the controller and the first event type may be a fail in accessing the logical volume.

Further, when the fault cause apparatus is one of the plurality of monitored apparatuses, second event information which includes the second event type and which has been obtained from the fault cause apparatus, may be identified from among the plurality of the event information, and information identifying the first monitored apparatus, the first event information, the fault cause apparatus, and the second event information may be sent to the screen output apparatus based on the correlation analysis rule information and the configuration information; thereby a message indicating that an event corresponding to the first event information that occurred in the first monitored apparatus is caused by an event corresponding to the second event information that occurred in the fault cause apparatus may be displayed on the screen output apparatus.

According to another embodiment of the present invention, in the system management server, an information processing apparatus that is an event-information acquisition target is registered as a monitored apparatus in configuration information; event information that complies with a rule stored in advance is identified from among a plurality of event information stored in the system management server; a server apparatus for a network service related to the event information is identified; and a message is displayed which indicates that the cause of the event that occurred in a client information processing apparatus which has generated event information is an event related to the network service, which occurred in the server apparatus.

Advantageous Effects

According to the present invention, even when an event has occurred in an IT apparatus from which event information is not obtained, an analysis result can be displayed.

BRIEF DESCRIPTION OF DRAWINGS

FIG. 4 schematically shows correlation analysis rule information used in the operation management system of the present invention.

FIG. 5 schematically shows topologies specified as application targets in the correlation analysis rule information shown in FIG. 4.

FIG. 6 schematically shows a rule-application-destination management table which is one example of a table data structure for managing lists of IT apparatuses to which rules are applied.

FIG. 7 is a processing flow of generating application information of the correlation analysis rule information according to one embodiment of the present invention.

FIG. 8 schematically shows connection information of IP-SAN storage apparatuses, obtained from computers serving as IP-SAN clients, in a first embodiment of the present invention.

FIG. 9 schematically shows configuration information related to an IP-SAN storage that is a management-target IT apparatus, the configuration information being held in configuration management, in the first embodiment of the present invention.

FIG. 10 is an example screen display which proposes a user to set a not-managed IT apparatus to a management target, in the first embodiment of the present invention.

FIG. 11 schematically shows a not-managed IT-apparatus management table which is one example of a table data structure for managing not-managed IT apparatuses, in the first embodiment of the present invention.

FIG. 12 schematically shows the rule-application-destination management table, holding lists of IT apparatuses to which rules are applied, in the first embodiment of the present invention.

FIG. 13 schematically shows connection information of FC-SAN storage apparatuses, obtained from computers serving as FC-SAN clients, in the first embodiment of the present invention.

FIG. 14 schematically shows information related to an FC-SAN storage that is a management-target IT apparatus, the information being held in the configuration management, in the first embodiment of the present invention.

EXPLANATION OF REFERENCE

N0: system management server
N1 to N3: computer
N4: network (NW) switch
N5: storage apparatus
O1: computer
O2: NW switch
O3: storage apparatus
M1: screen output apparatus

BEST MODE FOR CARRYING OUT THE INVENTION

Embodiments of the present invention will be described below.

First Embodiment

Figure 1:
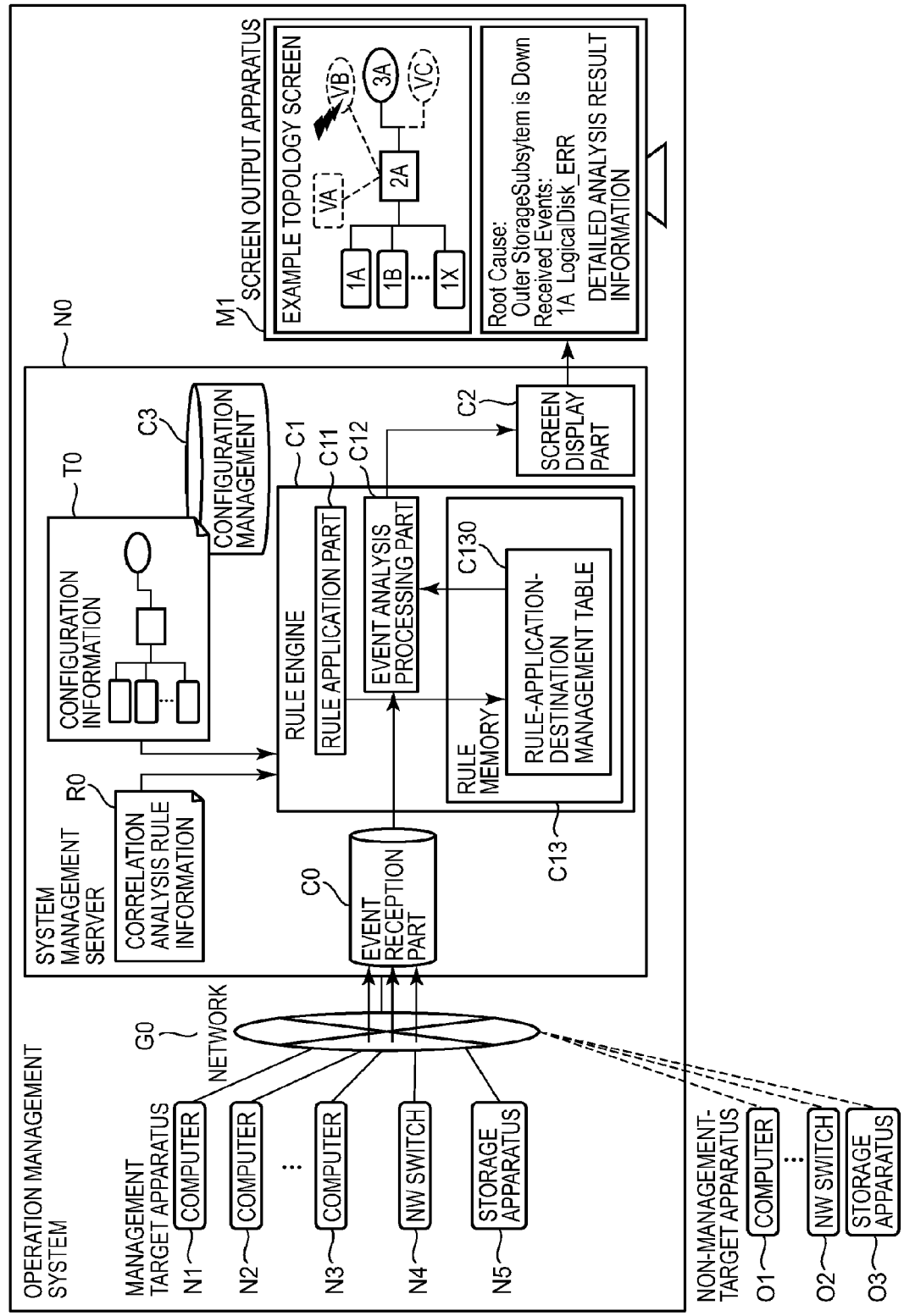
FIG. 1 shows an entire configuration diagram of an operation management system according to the present invention.

FIG. 1 is an overview showing one configuration of an information processing system for implementing the present invention.

The information processing system includes an operation management system and a system management server. In the operation management system, the system management server N0 monitors and manages, as management targets, computers, a network switch (NW switch), and a storage apparatus which constitute the IT system.

The system management server N0 of the present invention includes an event reception part C0 for receiving event information such as a status change in a management-target IT apparatus, fault information, and notification information; a rule engine C1 for performing fault analysis based on the received event information according to a rule R0 defined in advance; configuration management C3 for managing configuration information of management-target IT apparatuses; and a screen display part C2 for outputting information required for operation management to a screen.

Further, the operation management system includes a screen output apparatus M1 for displaying information used for operation management on the screen based on output data and the control of the screen display part. The screen output apparatus M1 is coupled to the system management server N0. Note that a first candidate for the screen output apparatus M1 is a display apparatus coupled to the system management server; however, another apparatus can be used instead if the apparatus can display analysis result information for the administrator of the operation management system. Other examples of the screen output apparatus M1 include a mobile terminal which can receive electronic mail sent from the system management server N0 and display it, as a screen output apparatus; and a computer having a display unit, which provides the administrator with information based on analysis result information sent by the system management server N0, receives an input from the administrator, and sends it to the system management server N0.

The rule engine C1 includes a rule application part C11 that reads analysis rule information R0 (hereinafter also referred to as correlation analysis rule information) used for event correlation analysis, obtains configuration information T0 from the configuration management C3, and performs processing to apply a rule to IT apparatuses in the IT system; a rule memory C13, serving as a working memory, for managing a rule-application-destination management table C130 in which application information used by the rule application part to apply a rule to IT apparatuses is managed and for performing rule analysis processing; and an event analysis processing part C12 that receives event information received by the event reception part C0 and performs event correlation analysis. Note that the rule-application-destination management table C130 may not be stored in the rule memory C13, but it needs to be stored in a memory of the system management server N0.

Note that the correlation analysis rule information may be generated and stored by the administrator of the system management server N0, may be included in a program of the present invention, to be described later, and stored in the memory, or may be stored in the memory through initializing processing of the program of the present invention.

Note that hardware items constituting the system management server N0 include a processor, the memory (including secondary storage devices typical of which are a semiconductor memory and an HDD), and a network port. Those hardware items are coupled to each other by an internal network such as a bus. Note that it is first conceivable that the event reception part C0, the rule engine C1, the screen display part C2, and the configuration management C3 are stored in the memory of the system management server N0 and realized by a program executed by the processor; however, part or all of those functions may be realized by hardware. Note that the program which includes the event reception part C0, the rule engine C1, the screen display part C2, and the configuration management C3 is referred to as an event analysis program in the following description.

Further, the correlation analysis rule information R0, the configuration information T0, and the rule-application-destination management table C130 are stored in the memory of the system management server N0. Further, the configuration information T0 includes at least one of the following: connection information of IP-SAN storage apparatuses (FIG. 8); information related to an IP-SAN storage (FIG. 9); connection information of FC-SAN storage apparatuses (FIG. 13); information related to an FC-SAN storage (FIG. 14); and identification information and public names related to file servers (FIG. 15), all of which will be described later. Further, a description will be given in which a not-managed IT-apparatus management table (FIG. 11), to be described later, is also included in the configuration information; however, if the not-managed IT-apparatus management table is stored in the memory of the system management server N0, it may be not stored as information which is not included in the configuration information T0.

Further, the correlation analysis rule information R0, the configuration information T0, the rule-application-destination management table C130, the connection information of IP-SAN storage apparatuses, the information related to an IP-SAN storage, the connection information of FC-SAN storage apparatuses, the information related to an FC-SAN storage, the identification information and the public names related to file servers, and the not-managed IT-apparatus management table are not necessarily stored in a text file, in a table, in a specific format such as that having a queue structure, or in a data structure; they just need to include information to be described later. In order to clarify that they are more general information in the following description and claims, the correlation analysis rule information R0, the configuration information T0, the rule-application-destination management table C130, the connection information of IP-SAN storage apparatuses, the connection information of FC-SAN storage apparatuses, the information related to an IP-SAN storage, the information related to an FC-SAN storage, the identification information and the public names related to file servers, the not-managed IT-apparatus management table are also referred to as correlation analysis rule information, configuration information, rule-application-destination management information, connection information of IP-SAN storage apparatuses, connection information of FC-SAN storage apparatuses, information related to an IP-SAN storage, information related to an FC-SAN storage, information of identification and public names related to file servers, and not-managed IT-apparatus management information, respectively.

In addition, the system management server stores, as event entries, event information received from various management-target IT apparatuses in an event database defined in the memory although that is not shown. Note that the event database may have any data structure if one or more event entries are included therein.

Note that event information includes event contents, and it may also include an event occurrence time. Further, in the event database, past event information may be left as a history according to a specified condition. When the event information is included in the event database and stored in the memory, the program (in particular, the configuration management C3) of the system management server may associate the event information with the identification information of an IT apparatus from which the event information has been obtained and with the time at which the system management server has received the event information, and may include them all together. Note that the event contents include at least the type of an event, and, depending on the situation, the event contents may also include information identifying hardware and software in the IT apparatus, in which the event has occurred.

The following items are conceivable as example event types, but there may be event types other than those items.

(A) The operation state of the IT apparatus enters a predetermined state (for example, the occurrence of a hardware fault or a software fault is included in this type).

(B) A predetermined health-check result is obtained (for example, a case where no health-check response is obtained for a given period of time is included in this type).

(C) The processing speed and the amount of used resources, such as a processor, a memory, and an HDD, which are components constituting the IT apparatus satisfy a predetermined condition (for example, a case where the remaining capacity of the HDD falls below 10% is included in this type).

(D) The IT apparatus receives network access which satisfies a predetermined condition (for example, a case where the IT apparatus received requests more than a predetermined number of times, a case where a network packet which is identified as a requested DoS attack is received a predetermined number of times, and a case where a request is received from an IT apparatus other than a specified IT apparatus are included in this type).

Note that in order to store the event analysis program in the memory, it is conceivable to use a method in which the program is installed or copied from a medium, such as a DVD-ROM or a CD-ROM, which has stored the program, or to use a method in which the program (or information from which the program can be generated on the memory) is received from a program distribution server that can communicate with the system management server N0; however, other methods can also be used. Alternatively, after the program is stored in the system management server N0 in advance, the system management server N0 may be distributed.

The above-described system management server N0 analyzes the root cause of faults in the information processing system.

In the operation management system, management-target IT apparatuses are specified in advance, event information is used as an analysis target of correlation analysis, and necessary information is received from the IT apparatuses. If all IT apparatuses coupled to the network are managed, the processor, the memory, and the storage device, such as a hard disk, of the management server needs to be used very exhaustively for the management, thereby making practical monitoring difficult. Therefore, management-target IT apparatuses, from which information is received, are specified to be narrowed down in the operation management system to avoid such difficulty. Further, when a management tool is a commercially-available tool, the number of licenses is limited based on the types and the number of IT apparatuses to be managed, in almost all cases. Therefore, the IT system includes an IT apparatus from which the system management server N0 obtains or is allowed to obtain event information for event information analysis (hereinafter, such an IT apparatus is also be expressed as monitored IT apparatus, managed IT apparatus, management IT apparatus, in-management IT apparatus, or monitored apparatus; and such expressions apply to a computer, a switch, a router, and a storage apparatus, which are specific examples of an IT apparatus), and an IT apparatus from which the system management server N0 does not obtain or is prevented from obtaining event information (hereinafter, such an IT apparatus is also expressed as not-monitored IT apparatus, not-managed IT apparatus, IT apparatus that is out of management, out-of-management IT apparatus, or event-related information processing apparatus; and such expressions apply to a computer, a switch, a router, and a storage apparatus which are specific examples of an IT apparatus).

IT apparatuses that are not monitored or managed in the system management server N0 are further classified into an IT apparatus that was once found, confirmed, or managed in the system management server N0, and an IT apparatus that has never been found, confirmed, or managed in the system management server N0. In some system management servers N0, for such an IT apparatus that was once managed, found, or confirmed, configuration information, for example, the IP address, the host name, or the fully qualified domain name (FQDN) of the IT apparatus, which is obtained when it is found or confirmed, may be held therein and managed, not always in the same manner as for an IT apparatus that is monitored and managed. In the present invention, a non-management-target IT apparatus for which corresponding configuration information is not held in the system management server N0 and a non-management-target IT apparatus for which part or all of corresponding configuration information has been stored in the system management server N0 are also defined as non-management-target IT apparatuses.

Example cases to be out of management of the operation management system include a case where a management-target IT apparatus uses a globally-provided service such as a DNS server, and a case where the operation management system cannot sufficiently obtain information used for management due to circumstances such as a firewall, an access-right problem, a network configuration, and an access-means defect.

The present invention relates to analysis of the correlation among a plurality of IT apparatuses existing in the network. However, even when events simultaneously occur due to a cause in a plurality of apparatuses which are correlated with each other, the clock signals in the individual apparatuses are shifted, and further, the timing to transfer event information is also shifted. Therefore, the system management server N0 analyzes event information that occurred or was received for the duration (a period of time) predetermined by a program developer or for a period of time specified by the administrator. Further, even when a cause arises, events related to the cause may occur at different timing (for example, in a case where a predetermined network service such as a Web service or a DNS service is received through caching processing from a server computer). Thus, analysis needs to be performed for a period of time instead of at a particular time.

It is preferable that desired events be items occurring dynamically to some extent. Further, it is more preferable that the time difference between the time at which an event occurs in an IT apparatus, serving as the cause, because a predetermined cause arises (or the time at which the system management server receives the event) and the time at which, due to the cause, an event occurs in another IT apparatus (or the time at which the system management server receives the event) causes an event during the above-mentioned period of time.

It is preferable that information conceivable as one piece of configuration information include the types and the number of hardware items constituting an IT apparatus, and the communication identification information and the name which are necessary to communicate with the IT apparatus, and be quasi-static information which can be partially changed by the administrator of the IT apparatus.

Figure 2:
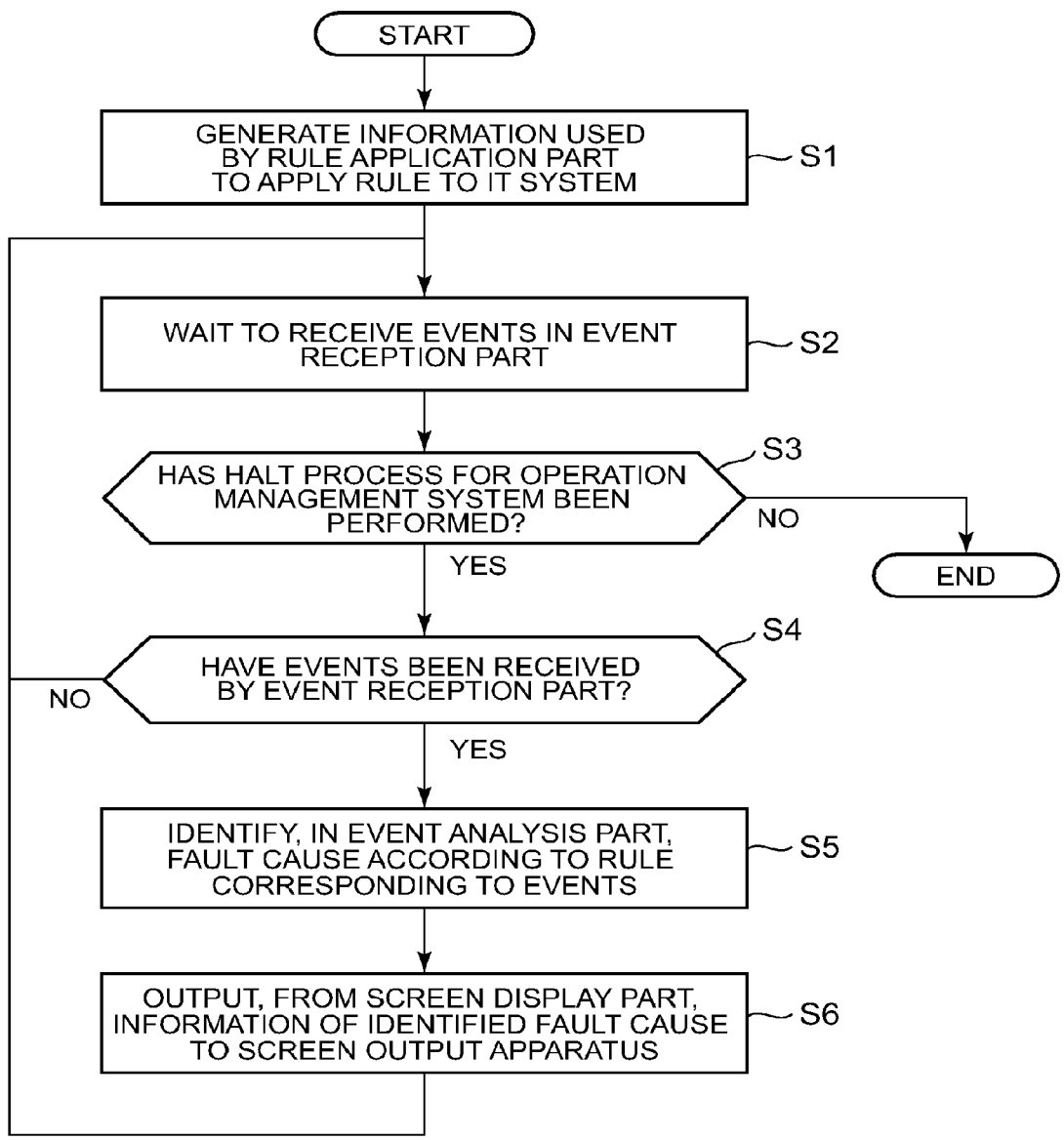
FIG. 2 schematically shows an entire processing flow of fault analysis according to one embodiment of the present invention.

FIG. 2 shows a flow of general processing based on the above-described configuration, according to one embodiment of the present invention.

In S1, the rule engine C1 reads the correlation analysis rule information R0 in advance, obtains the configuration information T0 of management targets from the configuration management C3, searches T0 for the identification information of IT apparatuses to which the rule group R0 is applied, and stores the identification information in the rule-application-destination management table C130. The process of S1 is a preparation process for fault analysis processing using events, to be performed later, and needs to be performed prior to the analysis processing. In the first embodiment, which is one of the embodiments, it is assumed that the analysis processing is performed prior to the start of the operation, and the rule-application-destination management table C130 is held in advance in the rule memory C13.

In S2, the event reception part C0 waits to receive events sent from the management-target IT apparatuses in the operation management system.

S3 is related to a system operation of the operation management system. S3 is a step to determine whether a halt process has been instructed and used to halt the operation.

In S4, it is judged whether events have been received by the event reception part C0. When it is judged that events have been received, the events received by the event reception part C0 are input to the event analysis processing part C12, a corresponding rule is determined based on the rule-application-destination management table C130, and a fault cause is identified according to the rule, in S5.

In S5, the identified fault cause is output to the screen display part C14. The screen display part C14 sends analysis information based on received analysis result output data, thereby outputting and displaying a screen necessary for the operation management on the screen output apparatus M1.

Note that received event information may be temporarily stored in the event database, instead of in the processes of S2 and S4.

One advantage of the present invention is to allow fault cause analysis for an IT apparatus that is not a management target, by changing the process of the rule application part in this general processing flow, without largely changing the configuration and the subsequent processing flow.

Figure 3:
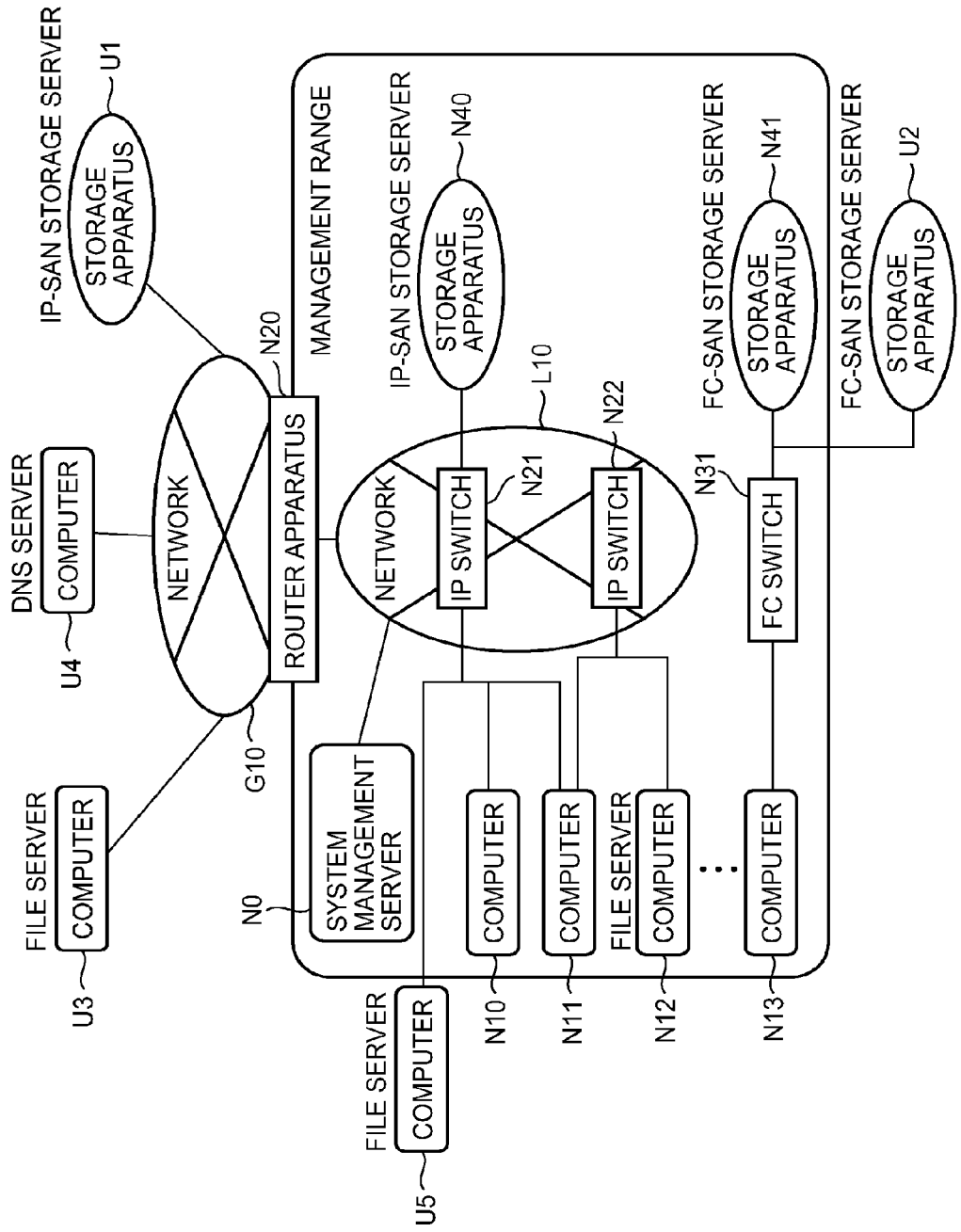
FIG. 3 schematically shows one representative configuration example of an IT system which is a target of the present invention.

FIG. 3 is an overview showing one configuration of an IT system assumed in the embodiments of the present invention. The IT system of FIG. 3 includes an operation management system which is a target of operation management including a computer N10, a computer N11, and a computer N12 which are operated and managed by the management server N0; an IP switch N21 and an FC switch N31 which are network switches; a storage apparatus N40; and a storage apparatus N41; a storage apparatus U2; and a computer U5 which are non-management-target IT apparatuses that are not managed by the management server N0; a storage apparatus U1 which are coupled to a network G0 via a router N20; a computer U3 and a computer U4. Note that the number of the IT apparatuses, such as computers, switches, routers, and storage apparatuses which are individually shown, is an example; the operation management system just needs to include at least an IT apparatus serving as a server which provides a network service and an IT apparatus serving as a client which receives the network service.

The storage apparatus U1, which is a non-management-target IT apparatus, includes an IP-SAN interface and provides the management-target computer N10 with a logical volume. The storage apparatus U2, which is a non-management-target IT apparatus, includes an FC-SAN interface and provides a management-target computer N13 with a logical volume via the management-target FC switch N31. The computer U3 or the computer U5, which is a non-management-target IT apparatus, is a file server and makes a file system available to both of the management-target computers N10 and N11. The computer U3 belongs to a network segment different from that of the operation management system, and detailed information related to the computer U3 cannot be obtained through the network.

On the other hand, the computer U5, serving as a file server, belongs to the same network segment as the operation management system, and can be automatically found by the operation management system. The computer U5 is an IT apparatus that was found at the time of the operation but was not set to a management target. The computer U4, which is a non-management-target IT apparatus, is a DNS server and applies a name solution function to all the IT apparatuses included in the IT system of FIG. 3.

To provide better understanding, a description will be given of how to apply a rule of an event correlation technology to management-target IT apparatuses, before the first embodiment is described.

FIG. 4 shows example rules suggesting that a fault in the controller of a storage apparatus is the root cause, for the IT system shown in FIG. 1. In a rule for identifying the root cause in fault analysis, a combination of events predicted to occur based on an event correlation and a fault serving as the root cause are described as a pair in an IF-THEN format, in many cases. In the IF-THEN format, a rule is expressed such that "when a condition described in the IF part is established, the THEN part is true".

In the embodiments, it is assumed that a rule is described in the IF-THEN format in the same way as general rules in expert systems, and information related to IT apparatuses to which the rule is applied is defined in advance in the IF condition part. Note that a rule may not be described in the IF-THEN format, but a topology needs to be defined in advance as any connection and relation information which can identify IT apparatuses to which the rule is applied.

In addition, information for actually storing each rule is called a rule entry. The correlation analysis rule information includes one or more rule entries. More abstractly, it can be said that a rule entry includes the following information.

(A) A condition entry indicating a condition that includes an event type to which the rule is applied. As described above, this condition entry may include a topology as a condition.

(B) A cause entry indicating an event serving as a cause and the location of an IT apparatus related to the event or its hardware and software, when the condition is satisfied.

In the first embodiment, it is assumed that the following rules are defined in advance as shown in FIG. 4: a rule R1 in which the root cause is a fault in the controller of an IP-SAN storage apparatus that uses iSCSI; a rule R2 in which the root cause is a fault in the controller of an FC-SAN storage apparatus that uses Fibre Channel; a rule R3 in which the root cause is a fault in a file server; and a rule R4 in which the root cause is that the network does not reach the DNS server. FIG. 6 shows the rule-application-destination management table that is information holding, for each rule, IT apparatuses to which the rule is applied. The rule-application-destination management table includes a column C101 for identification information indicating a rule, and a column C102 for the list of application-destination IT apparatuses, storing the identification information of IT apparatuses to which the rule is applied. The rule-application-destination management table does not need to be in a database. Note that this table data structure may be divided into a plurality of table data structures by normalizing the table, and the plurality of table data structures may be managed.

FIG. 5 shows topology patterns to which the rules R1 to R4, shown in FIG. 3, are applied. FIG. 5(1) shows a topology of connection and relation information suggested by the IF part of the rule R1. FIG. 5(1) indicates that Computer indicating a computer has iScsiInitiator and is coupled to iScsiTarget of Storage indicating a storage apparatus via Ipswitch indicating an IP switch. iScsiTarget is an iSCSI name identifying the connection destination of iScsiInitiator. The rule R1 is applied to a combination of a computer and a storage apparatus in which connection-destination iScsiTarget held by the computer matches the iSCSI name of an iScsi port of the storage apparatus. Rows L101 and L102 of FIG. 6 show IT apparatuses to which the rule R1 is applied in the IT system of FIG. 3.

Similarly, FIG. 5(2) indicates that a computer has FcHba and FcHba is coupled to FcPort of a storage apparatus via FcSwitch, as suggested by the IF part of the rule R2. When a connection-destination port WWN (WWN: World Wide Name) held by FcHba matches FcPortWWN, which is WWN of FcPort serving as a Fibre Channel port of the storage apparatus, it means that they have a connection relation and the rule R2 is applied to them. A row L103 of FIG. 6 shows IT apparatuses to which the rule R2 is applied, as a combination of the computer and the storage apparatus, in the IT system of FIG. 3.

FIG. 5(3) shows a case where the IF part of the rule R3 indicates a topology of a file server and a client. A computer T31 having information of ImportedFileShare which indicates that a file system of the file server is mounted and a computer T33 having information of ExportedFileShare which indicates that the file system is made available to the outside have the relation of a client and a file server via an IP switch T32. ImportedFileShare T311 includes, as information related to the file server of the mount source, the identification information (the IP address, the FQDN (Fully Qualified Domain Name), etc.) of the file server, and the public name of the file system made available to the outside. ExportedFileShare T331 includes the location of the file system made available to the outside and the public name (also called share name) thereof.

When the computer indicated by the identification information of the file server specified by ImportedFileShare has information of ExportedFileShare, and the public name in ExportedFileShare matches the public name specified by ImportedFileShare of the computer T31, the rule R3 is applied to those computers, as a pair, as the topology of the file client and the file server. A row L104 of FIG. 6 shows IT apparatuses to which the rule R3 is applied, as a combination satisfying the above condition, in the IT system of FIG. 3.

FIG. 5(4) shows a topology of a DNS server and a client suggested by the rule R4. A computer T42 serving as the DNS server, which provides a name solution service, and a computer T41 serving as the client, which solves an IP address and an FQDN name with the DNS server, are stored as a pair in the application-destination management table shown in FIG. 6.

It is assumed that the configuration corresponding to topology information related to such connections and relations described in the rules is defined in advance in the system, and is uniquely determined by the description of each rule.

The application-destination management table of FIG. 6 for IT apparatuses to which each rule is applied is provided. Therefore, when events occur, it is possible, by referring to the table, to judge a rule to which the events are related and to select a rule to be applied. The method of applying a rule to management-target IT apparatuses has been described above.

Figure 21:
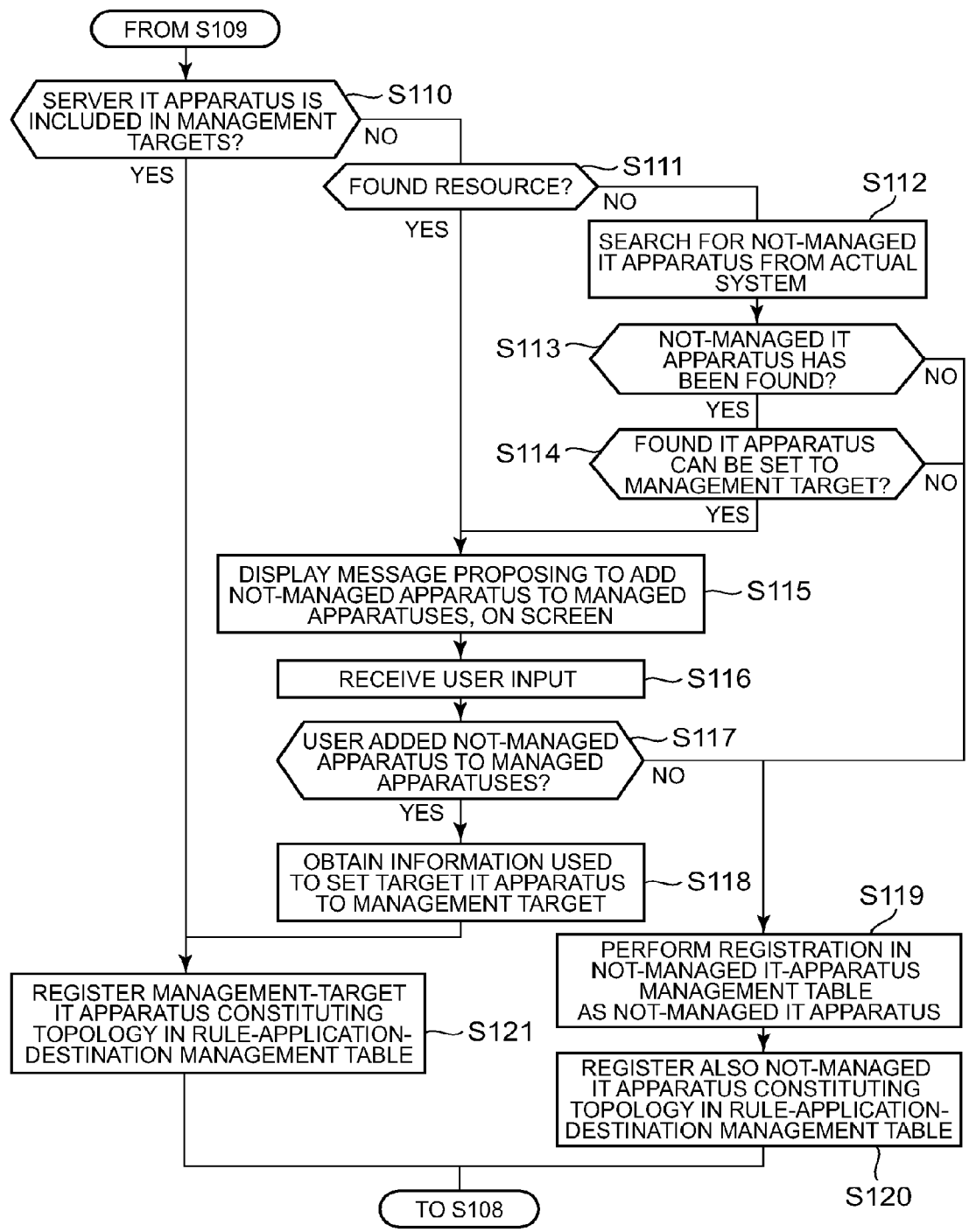
FIG. 21 is the processing flow of generating application information of the correlation analysis rule information, according to one embodiment of the present invention.

FIGS. 7 and 21 show details of Step S1 of FIG. 2 performed in the rule application part C11, according to one embodiment of the present invention. With reference to the processing flow, the first embodiment will be described with the IT system shown in FIG. 3 and the rules R1 to R4 shown in FIG. 4. The entire processing shown in FIGS. 7 and 21 is performed in the rule application part. It is assumed that the operation management system stores in advance an IT apparatus once found, and can judge that the IT apparatus has been found. Alternatively, when the operation management system does not have a function of automatically finding an IT apparatus in the IT system, or even if the operation management system has the function of automatically finding an IT apparatus in the IT system, when it does not have a function of storing the found IT apparatus, the processing of FIGS. 7 and 21 is performed as if the found IT apparatus did not exist.

(Description of a General Flow and a Case where the Rule R1 is Applied)

In S101, it is judged whether a rule to be read, that is, a rule that has not been read yet, is included in the correlation analysis rule information R0. When it is judged that a rule to be read is included (YES), the flow advances to S102. Otherwise (NO), the flow ends. Since rules to be read, which are the rules R1 to R4, are included (YES), the flow advances to S102.

In S102, one rule is read. The rule is marked or is stored as a read rule, for example, so that it can be recognized to be one that has been read. In the embodiment, the rule R1 is read and is stored as a read rule. The flow advances to S103.

In S103, a search condition for IT apparatuses corresponding to the topology information described in the rule is obtained and the flow advances to S4. In the embodiment, a search condition is obtained for IT apparatuses which include a computer having iScsiInitiator, a storage apparatus having an iSCSI port identified by iScsiTarget, and an IP switch coupled to them and to which the rule R1 is applied as in the topology information of the rule R1. It is assumed that the search condition is defined in advance with respect to the description of the rule.

In S104, the configuration information of management-target IT apparatuses is searched for the IT apparatus serving as a client in the topology information. When the configuration information is stored in a database, the database is searched. When the configuration information is stored in a file, the file is searched. A storage medium, a device, or the like to be searched does not matter. In the embodiment, the configuration information is searched for the computer having iScsiInitiator, serving as a client in the topology of the rule R1. In this embodiment, when it is assumed that the computer N10 or the computer N11 has iScsiInitiator, the identification information of the computer N10 and the computer N11 is found through the search.

In S105, it is judged whether an IT apparatus that has not been selected is included in the IT apparatuses found through the search, because processes of S106 and the subsequent steps are performed for a plurality of computers. In this embodiment, since the computer N10 and the computer N11 are IT apparatuses that have not been selected, the flow advances to S106.

In S106, one of the IT apparatuses that have not been selected is selected and regarded as a selected IT apparatus. In this embodiment, the computer N10 is selected and regarded as a selected IT apparatus. The flow advances to S107.

In S107, information of IT apparatuses serving as servers which are opposed, in the topology, to the IT apparatus selected in S106 is obtained. The information of an IT apparatus serving as a server includes: information identifying the IT apparatus serving as the server (such as the IP address, the host name, or the FQDN); and information related to a service to be provided (the public name (also called share name) of an available file system of the file server, the LUN number identifying a disk volume of the storage apparatus, the iSCSI name of a connection destination, or the WWN of an FC Port). In this embodiment, ConnectedIscsiTarget which is the iSCSI name of a connection destination shown in FIG. 8 is obtained as the information of storage apparatuses serving as servers, which are opposed to the computer N10.

In S108, it is judged whether information corresponding to an IT apparatus that has not been searched for is included in the information related to IT apparatuses serving as servers, obtained in S107. When it is judged that such information is included (YES), the flow advances to S109. When it is judged that such information is not included (NO), the flow returns to S105. In this embodiment, since at least three pieces of information which have not been searched for are included as shown in FIG. 8 (YES), the flow advances to S109.

Information shown in FIG. 8 is described. The information includes the identification information indicating an IT apparatus (more specifically, a computer) and the identification information, in iSCSI, of a storage apparatus to which the IT apparatus is coupled.

In S109, one piece of information which has not been searched for is selected from the information related to IT apparatuses serving as servers, obtained in S107. Based on the selected information, the configuration information of management targets is searched for the IT apparatus serving as a server. In this embodiment, the configuration information of management targets is searched for a storage apparatus having, as iScsiTarget, an iSCSI name indicated in a row L201 of ConnectedIscsiTarget shown in FIG. 8, obtained from the computer N10.

In S110, when the corresponding storage apparatus is not included in management-target IT apparatuses (NO) through the search in S109, the flow advances to S111. On the other hand, when the corresponding storage apparatus is included in management-target IT apparatuses (YES), usual rule application processing will be performed and the flow advances to S121. In this embodiment, FIG. 9 shows configuration information about iScsiTarget of a management-target storage apparatus. Since the storage apparatus having iScsiTarget identical to ConnectedIscsiTarget in the row L201 of FIG. 8 is not found in the management target as shown in FIG. 9, the flow advances to S111.

Information shown in FIG. 9 is described. The information includes the identification information indicating a storage apparatus and the identification information, in iSCSI, held by the storage apparatus.

Note that the configuration information T0 includes, for each of one or more IT apparatuses that have been found, event-acquisition permission/inhibition information which indicates whether the apparatus is an event acquisition target (specifically, whether the apparatus is monitored; in other words, whether event acquisition from the apparatus is permitted or inhibited). The judgment of S110 is performed by referring to this data.

In S111, it is judged whether the IT apparatus has been already found in the operation management system. Specifically, it is judged whether the IT apparatus was once found, confirmed, or managed in the operation management system and the static configuration information of the IT apparatus is partially held in the operation management system. In this embodiment, since there is no configuration information related to the storage apparatus having iScsiTarget identical to ConnectedIscsiTarget in the row L201 of FIG. 8, it is assumed that the IT apparatus is not a found resource (NO). Then, the flow advances to S112.

Note that the judgment of S111 can be performed by judging whether information related to the apparatus (for example, the event-acquisition permission/inhibition information) is included in the configuration information.

In S112, an attempt is made to find the storage apparatus having iScsiTarget identical to ConnectedIscsiTarget in the row L201 of FIG. 8, from not-managed IT apparatuses. There is an example method of searching for the not-managed IT apparatus, to be used in S112. In the method, a request to receive a service related to the target resource is sent to a communication identifier such as the FQDN or the IP address corresponding to the target resource, obtained from the configuration information or input by the user; or a communication identifier such as the FQDN or the IP address in the network address, which is the IP address corresponding to the network segment that includes the target resource, obtained from the configuration information or input by the user. Depending on whether a response to the request is returned, the presence of the target resource is confirmed. In this embodiment, an attempt is made to find the storage apparatus from the IT system shown in FIG. 3.

In S113, it is judged whether the attempt made in S112 has succeeded. When it has succeeded (YES), the flow advances to S14. Otherwise (NO), the flow advances to S116. In this embodiment, it is assumed that a storage apparatus U3 shown in FIG. 3 has been found as the corresponding storage apparatus, and the flow advances to S114.

In S114, it is judged whether the IT apparatus found in S113 can be set to a management target of the operation management system. Whether the IT apparatus can be set to a management target is judged depending on whether information required by the operation management system for monitoring and management can be obtained from the target IT apparatus. Although information required for monitoring and management is different for each operation management system, information identifying the IT apparatus is required in common that includes at least one of the following: the IP address, the WWN (World Wide Name), some unique identification information (number), an apparatus name (host name), and the FQDN.

It is preferred that one or more pieces of information related to the types or the number of hardware items constituting the IT apparatus be able to be obtained to some extent. In the present invention, it is assumed that the system management server N0 holds a predetermined criterion and this judgment is performed based on the criterion. In this embodiment, it is assumed that, as information related to the storage apparatus U3, the storage apparatus has an iSCSI port and information of iScsiTarget can be obtained as the iSCSI name of the iSCSI port. It is also assumed that the IT apparatus has been judged to be able to be set to a management target. The flow advances to S115. Note that, since this apparatus may be set to a management target in a process to be performed later, the processing may be configured such that it is confirmed in this step that event information can be received from this IT apparatus, and only when it is confirmed that event information can be received from this IT apparatus, the flow advances to S115.

In S115, whether the IT apparatus found in S113 is set to a management target is presented to the user. In this embodiment, the fact that the storage apparatus U3 has been found as a storage server for the computer N1 and whether the storage apparatus U3 is added to management targets are presented. The indication screen is shown in FIG. 10.

In S116, the system management server N0 (in particular, the rule engine) receives an input from the management screen output apparatus.

In S117, it is judged whether the user has set the found IT apparatus to a management target. When the user has set the found IT apparatus to a management target (YES), the flow advances to S118. Otherwise (NO), the flow advances to S119. In this embodiment, it is assumed that the user did not set the storage apparatus U3 to a management target, and the flow advances to S119.

In S118, information for the IT apparatus which the user has determined to add to management targets is obtained and is stored in the configuration management as information of a management-target IT apparatus. In this embodiment, this side of branch is not being processed at this point.

In S119, information which can be obtained for the server opposed to the client and handled as a not-managed IT apparatus is stored and managed in the not-managed IT-apparatus management table. The flow advances to S120. In this embodiment, it is assumed that the FQDN and iScsiTarget which is the iSCSI name of the IP port of the storage apparatus can be obtained as information identifying the storage apparatus U3 and are stored in the not-managed IT-apparatus management table TL3 shown in FIG. 11.

A description is given with reference to FIG. 11. The not-managed IT-apparatus management table TL3 includes the following information for each of not-managed IT apparatuses that have been found.

(A) The identification information of the not-managed IT apparatus (B) The type C401 of the not-managed IT apparatus (C) The communication identification information C402 of the not-managed IT apparatus (D) The identification information C403 required to access a service of the not-managed IT apparatus In S120, the identification information of the not-managed IT apparatus is marked such that it can be recognized that the IT apparatus is not managed, and then the identification information is stored in the rule-application-destination management table TL1 as shown in FIG. 12. In this embodiment, the identification information is stored in the rule-application-destination management table TL1, based on the information related to the storage apparatus U3 included in the not-managed IT-apparatus management table. After the identification information is stored, the flow returns to S8, in which it is judged whether search information related to an IT apparatus serving as a server opposed to the selected IT apparatus serving as a client is included.

In this embodiment, when the flow returns to S108, it is judged whether information that has not been searched for is included in the search information related to storage apparatuses serving as servers, obtained in S107. Since there is search information related to a storage serving as a server for the computer N10, as in the row L202 of FIG. 8, the flow advances to S109.

In S109, the storage apparatus corresponding to L202 is searched for in the configuration management. In the embodiment, since the storage apparatus corresponding to L202 exists as shown in FIG. 9, it is recognized that the IT apparatus corresponding to L202 is a management target. Therefore, it is judged in S110 that the IT apparatus is a management-target IT apparatus, and the flow advances to S120. In S120, the list of the storage apparatus N40 and the computer N10, which are management-target IT apparatuses, is stored in L101 of the rule-application-destination management table of FIG. 11, as IT apparatuses to which the rule R1 is applied.

Through the above-described steps, the rule R1 can be applied also to the non-management-target storage apparatus U1, which provides the computer N10 with a logical volume.

Next, referring to the rule-application-destination management table of FIG. 11, a description will be given of an example case of S6 of FIG. 2. Specifically, a description will be given of screen display processing in which, when a fault occurs in the storage apparatus U1 that is not managed, the storage apparatus U1 is displayed on the screen as the root cause of the fault.

When a controller fault event occurs in the storage apparatus U1, and the fault-cause location is identified in the event analysis processing part C12 shown in FIG. 1 through event correlation according to a rule based on the rule-application-destination management table of FIG. 11, information of an analysis result is sent to the screen display part C2. According to the flow of FIG. 16, the screen display part C2 judges whether the IT apparatus serving as the root cause is a management target, and causes the screen display apparatus M1 to display a proper screen.

Figures 15, 16:
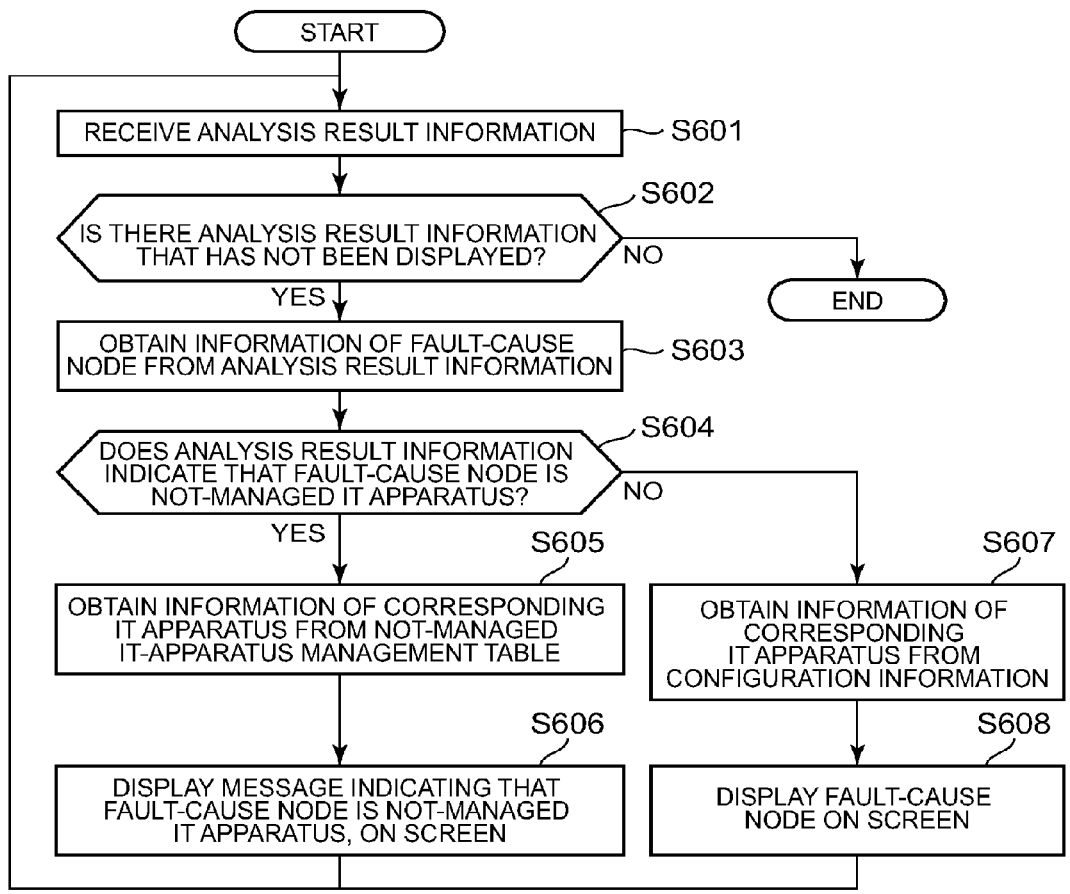
FIG. 15 schematically shows identification information and public names related to file servers, which can be obtained from computers serving as the file servers, in the first embodiment of the present invention.
FIG. 16 schematically shows a processing flow of displaying a fault analysis result on a screen, in the first embodiment of the present invention.
Figure 17:
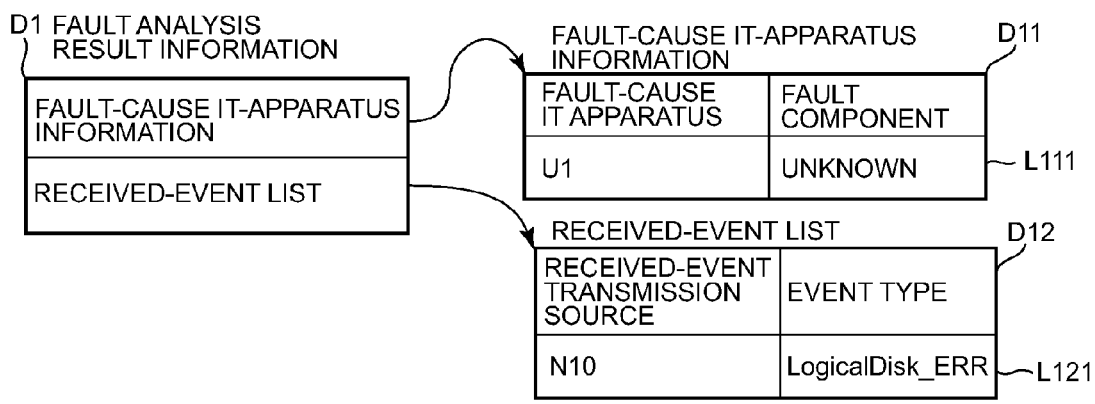
FIG. 17 schematically shows an example of fault analysis result data in a case where a not-managed IT apparatus causes a fault, in the first embodiment of the present invention.

In Steps 601 to 603 of FIG. 16, the screen display part C2 obtains, from the rule engine C1, fault analysis result data D1 shown in FIG. 17 which indicates a fault analysis result obtained in the rule engine. Note that the rule engine C1 (in particular, the event processing analysis part C12) performs processes described with reference to S4 of FIG. 2, and FIGS. 4 and 5.

The fault analysis result data D1 includes fault-cause IT-apparatus information which is information related to a fault-cause IT apparatus and a received-event list which is information related to an event in a management-target IT apparatus, received by the operation management system. The fault-cause IT-apparatus information D11 includes information indicating the fault-cause IT apparatus and information related to a component at the fault location. Acquisition of the information related to a component at the fault location depends on how much fault information can be obtained from the fault-cause IT apparatus that is a non-management-target IT apparatus. When fault information cannot be obtained at all, "unknown" is indicated as in FIG. 17. The received-event list includes a received-event transmission source which is information related to the transmission source of the received event which is information related to a correlated received-event in the rule defining this fault; and an event type indicating information related to the contents of the event.

In S604, it is judged whether the fault-cause IT apparatus is a management target or a non management target, from the fault-cause IT-apparatus information of the obtained fault analysis result data D11. In this embodiment, since the fault-cause IT apparatus is a non-management-target IT apparatus, the flow advances to S605.

In S605, the not-managed IT-apparatus management table of FIG. 11 is searched based on the fault-cause IT-apparatus information of the fault analysis result data D11, and information related to this not-managed IT apparatus is obtained. Then, the flow advances to S606. In this embodiment, information related to the storage apparatus U1 is obtained from L401 of FIG. 11.

Figure 18:
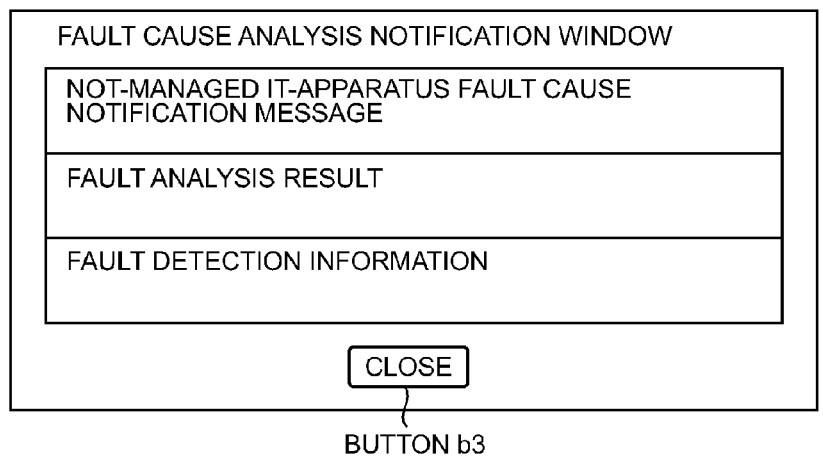
FIG. 18 schematically shows an example screen display configuration for a fault analysis result in the case where the not-managed IT apparatus causes a fault, in the first embodiment of the present invention.
Figure 19:
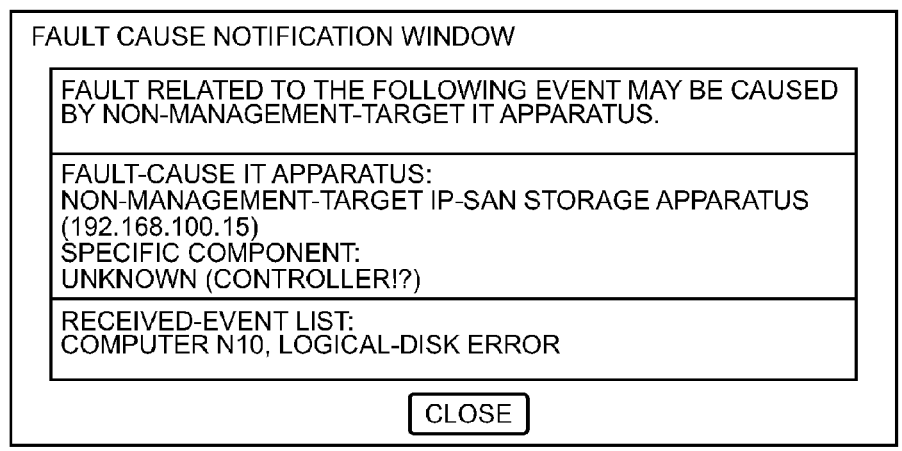
FIG. 19 schematically shows screen display for a fault analysis result in the case where the not-managed IT apparatus causes a fault, in the first embodiment of the present invention.

In S606, a message indicating that the root cause of the fault that occurred is a not-managed IT apparatus is displayed on the screen, together with the information obtained in S605. As shown in FIG. 18, an example structure of the screen displayed at this time includes a message notifying that the not-managed IT apparatus is the root cause of the fault; a fault analysis result which is the result obtained through analysis of the cause of the fault; and fault information detected by the operation management system for the fault that occurred, such as a received event. A screen display such as a window or a dialog that includes the above items is output to the screen output apparatus M1. FIG. 19 shows an example screen display in a case where the fault in the storage U1 that is a not-managed IT apparatus is the root cause, according to this embodiment. The screen display includes information indicating that the fault-cause IT apparatus is a non management target, and the type of the IT apparatus. For example, the screen display shows that the IT apparatus is an IP-SAN storage apparatus, and the IP address, which is an example of the identification information, of the IT apparatus is 192.168.100.15.

Through the above-described steps, when a fault occurs in the storage apparatus U1, which is a non-management-target IT apparatus, it is possible to handle a case where a fault of an IP-SAN storage, as defined in the rule R1, occurs in a non management target. It is also possible to display a message indicating that the root cause is a non-management-target IP-SAN storage, on the screen.

(Processing Flow for Rule R2)

For the rule R2, the flow will be described according to the embodiment in which the IT system of FIG. 3 is a target.

In S101, since the rule R2 is included, the flow advances to S102. In S102, the rule R2 is read and R2 is marked to indicate that it has been read. In S103, as topology information described in the rule R2 and as the FC-SAN topology of FIG. 4(2), a topology in which a computer T21 serving as a client and having a Fibre-Channel Host Bus Adapter, i.e., FcHba T211, is coupled via an FC switch T22 to a storage apparatus T23 serving as a server and having FcPort T231 which is a Fibre-Channel port is defined in the search condition.

In S104, it is assumed that the computer N13 having FcHba is found as a client IT apparatus.

In S105, since the computer N13 is an IT apparatus that has not been selected, the flow advances to S106.

In S106, the computer N13 is selected and is marked to indicate that it has been selected.

In S107, ConnectedFcPortWWN C502 indicating the WWN of an FC Port, which is a Fibre-Channel port, of the storage apparatus serving as a server to which the computer N13 is coupled is obtained from the computer N13 as shown in FIG. 13.

The connection information of FC-SAN storage apparatuses shown in FIG. 13 is described. The connection information includes, as information for each IT apparatus, the communication identification information of FibreChannel held by a storage apparatus to which the IT apparatus is coupled.

In S108, since ConnectedFcPortWWN which is search information related to the storage apparatus coupled to the computer N13 has not been searched for, the flow advances to S109.

In S109, by using a value specified in C502 in a row L501 as ConnectedFcPortWWN obtained from the computer N13, the storage apparatus having this WWN as an FcPort WWN is searched for.

In S110, as a result of the search in S109, the storage having the value specified in C502 in the row L501 of FIG. 13 as an FcPort WWN was not found in the configuration information of a management target as shown in FIG. 14. Thus, the flow advances to S111.

Information shown in FIG. 14 is described. The information includes the identification information indicating a storage apparatus and the communication identification information used in FibreChannel held by the storage apparatus.

In S111, the storage apparatus U2 having the value specified in C502 in the row L501 of FIG. 13 as an FcPort WWN is found among storage apparatuses that have been found. Thus, the flow advances to S115.

In S115, a message proposing to add the found storage apparatus U2 to the managed IP apparatuses is displayed on the screen. FIG. 10 shows an example screen display used for the rule R1, but the structure of screen display is basically the same and just the message contents are replaced with those for the actual IT apparatus.

In S116, the identification information of the storage apparatus U2 and instruction information to add this apparatus to the management targets are received from the administrator.

In S117, it is judged whether the user added the apparatus to the management targets. In this embodiment, since the user added the apparatus to the management targets, the flow advances to S118.

In S118, information that needs to be obtained as that for a management-target IT apparatus is obtained for the storage apparatus U2 added as a new management target. The information to be obtained as that for a management target includes event information and configuration management information.

In S121, the storage apparatus U2 serving as a management-target IT apparatus and the computer N14 are registered in the rule-application-destination management table as IT apparatuses to which the rule R2 is applied. In this example case, they are registered in the table data structure formed of the column C101 for a rule and the column C102 for storing the list of IT apparatuses to which the rule is applied, shown in FIG. 12.

As described above, with respect to the rule R2, fault analysis for an FC-SAN storage apparatus that is a non-management-target IT apparatus can be performed through the conventional rule-based event correlation.

Note that processing of displaying a message indicating that the FC-SAN storage that is a non-management-target IT apparatus is the root cause of the fault, on the screen based on the fault analysis result data is performed through the steps of FIG. 16 in the same way as the processing of displaying on the screen a message indicating that the non-management-target IP-SAN storage is the root cause of the fault, performed for the rule R1.

Through the process steps described above, when a fault occurs in the storage apparatus U2 that is a non-management-target IT apparatus, also in the rule R2, it is possible to handle the case where a fault of an FC-SAN storage, as defined in the rule R2, occurs in a non management target. It is also possible to display on the screen a message indicating that the root cause is a non-management-target FC-SAN storage.

(Processing Flow for Rule R3)

For the rule R3, the flow will be described according to the embodiment in which the IT system of FIG. 3 is a target.

In S101, since the rule R3 is included, the flow advances to S102. In S102, the rule R3 is read and R103 is marked to indicate that it has been read. In S103, as topology information described in the rule R3 and as the topology of a file server and a client shown in FIG. 4(3), a topology in which the computer T31 serving as a client and having ImportedFileShare T311 which indicates that a file system made available is mounted is coupled via an IP switch T32 to the computer T33 serving as a server and having ExportedFileShare T331 which indicates that the computer T33 has the file system made available to the other computers is defined in the search condition.

In S104, it is assumed that the computer N10 shown in FIG. 3 is found as the client IT apparatus in the topology of FIG. 4(3).

In S105, the computer N10 is the client IT apparatus that has been searched for and that has not been selected. Thus, the flow advances to S106.

In S106, the computer N10 shown in FIG. 3 is selected as the client IT apparatus that has not been selected, and is marked as a selected IT apparatus.

In S107, information of ImportedFileShare indicating the file server from which the file system made available is mounted is obtained as search information for the computer serving as a server IT apparatus opposed to the computer N10 in the topology of FIG. 4(3). Information related to the file server, obtained from the client, is managed in a table of FIG. 15. The table has a data structure which includes a column C701 for a client computer, a column C702 for the identification information related to a file server for the client computer, and a column C703 for the public name of the file server. Note that the information related to a file server, obtained from the client, may be obtained in advance as configuration information in the table of FIG. 15, or may be obtained from the client IT apparatus in the process of S7. In other words, the acquisition of such information needs to be performed before the process of S107 is completed.

Information shown in FIG. 15 is described. The information includes the following information for each file server.

(A) The identification information of the file-server IT apparatus (B) The identification information and the public names of one or more file servers In S108, the information related to the file server for the client, obtained in S107, is included in a row L701 of FIG. 15 and has not been searched for. Thus, the flow advances to S9.

In S109, an IT apparatus having the value specified in the column C702, for the identification information of a file server, in the row L701 of FIG. 15, that is, an FQDN of exportfs.domain2.com, is searched for.

In S110, the computer having the FQDN of exportfs.domain2.com is not included in the configuration information T0 of management targets. Thus, the flow advances to S111.

In S111, the computer having the FQDN of exportfs.domain2.com is not included in found resources. Thus, the flow advances to S112.

In S112, an attempt is made to find the computer having exportfs.domain2.com. The attempt is made such that an IP address is solved by making an inquiry to the DNS server, the presence thereof is confirmed by sending a ping to the IP address, and the computer is accessed through a remote connection of telnet, ssh, or Windows (registered trademark). In this embodiment, it is assumed that the ping to the IP address corresponding to exportfs.domain2.com returns "success" and the presence thereof is confirmed, but, since authentication information about the server is not held, other accesses fail, thereby preventing login. The flow advances to S114.

In S114, the found computer having exportfs.domain2.com cannot be set to a management target because, although it returns the ping response, information other than the response cannot be obtained therefrom. Thus, the flow advances to S119.

In S119, the computer having exportfs.domain2.com is registered in the not-managed IT-apparatus management table of FIG. 11. Specifically, as shown in L403 of FIG. 10, the information obtained from the client is stored in file-server identification information and service identification information.

In S120, rule application information is generated for the pair of the client computer N10 and the computer U having exportfs.domain2.com. Specifically, as shown in L107 of FIG. 121, the computer N10 and the computer U3 that is a not-managed IT apparatus are registered in the list of application-destination IT apparatuses for the rule R3.

As described above, fault analysis can also be performed for the computer U3 that is a not-managed IT apparatus serving as a file server for the computer N10.

Similarly, a description will be given of the processing flow according to the embodiment, in a case where the computer N11 is found as a client IT apparatus in the rule R3 through Steps S101 to S104. Through Steps S105 to S107, information specified in a row L703 of FIG. 15 and related to a file server for the computer N11 is obtained. In S109, since the file server specified in the row L703 of FIG. 15 is not found in the management-target IT apparatuses, the flow advances to S111. In S111, the computer U5 having the IP address specified in the row L703 of FIG. 15 is found in the found resources. Thus, the flow advances to S115.

In S115, a message proposing to add the computer U5 to management targets is displayed on the screen. In S116, a user instruction to set the computer U5 to a management target is received as a user input.

In S117, since the user instruction to set the computer U5 to a management target has been received in S116, the flow advances to S118.

In S118, as information required to set the computer U5 to a management target, monitoring information that includes configuration information, the operation state, and performance information of a device coupled to the computer U5 is obtained in addition to the identification information of the IT apparatus, held as that of a found resource, and information used for access. The obtained information is stored in the configuration information T0 of management targets, in the configuration management C3.

In S121, the data structure shown in a row L108 of FIG. 12 is stored in the rule memory, so that the rule R3 can be applied to a topology which includes the computer N11 that is a managed IT apparatus serving as a client and the computer U5 serving as a file server.

As described above, it is possible to perform fault analysis for the computer U5 serving as a file server, which was a found IT apparatus but was not a management target, according to the flow of FIG. 2. Further, when the flow of FIG. 16 is performed in the screen display part C2, the fault cause can be output to the screen display apparatus M1.

(Processing Flow for Rule R4)

For the rule R4, the flow will be described according to the embodiment in which the IT system of FIG. 3 is a target.

Through Steps S101 to S104, the computer N10 is found as a client IT apparatus in the rule R4. Through Steps S105 to S107, as search information of a DNS server for the computer N10, the IP address 192.168.100.1 of the DNS server is obtained from the computer N10. Through Steps S108 to S110, it is confirmed that the DNS server is not included in the configuration information T0 of management targets in the configuration management C3, by using the obtained IP address 192.168.100.1. The flow advances to S111. In S111, it is judged that the DNS server is not a found IT apparatus. The flow advances to S112. In S112, an attempt is made to access the node having the IP address 192.168.100.1 from the actual IT system. As a result of the access, network connection is confirmed using a ping, but the node cannot be logged in because authentication information is not held. In S114, it is judged that the DNS server cannot be set to a management target. The flow advances to S119. In S119, as shown in L404 of FIG. 11, information of the computer having the IP address 192.168.100.1 is stored and managed as that of a non-management-target IT apparatus and as that of a DNS server with identification information U4. The flow advances to S120. In S120, the computer N10 serving as a client and the computer U4 that is a not-managed IT apparatus serving as a DNS server are stored in the list of application-destination IT apparatuses for the rule 4, as shown in a row L109 of FIG. 12.

Through the above-described steps, it is possible to perform fault analysis for the computer U4, which is a not-managed DNS server, through the conventional rule-based event correlation. It is also possible to identify the not-managed DNS server as the root cause.

The rule 4 can be similarly applied to another IT apparatus shown in FIG. 3 by generating application information for the computer U4 that is a not-managed DNS server.

In the same way as for the other rules in the embodiment, when the flow of FIG. 16 is performed in the screen display part C2, a message indicating that the DNS server that is a not-managed IT apparatus is the root cause of the fault can be displayed on the screen.

Second Embodiment

Figure 20:
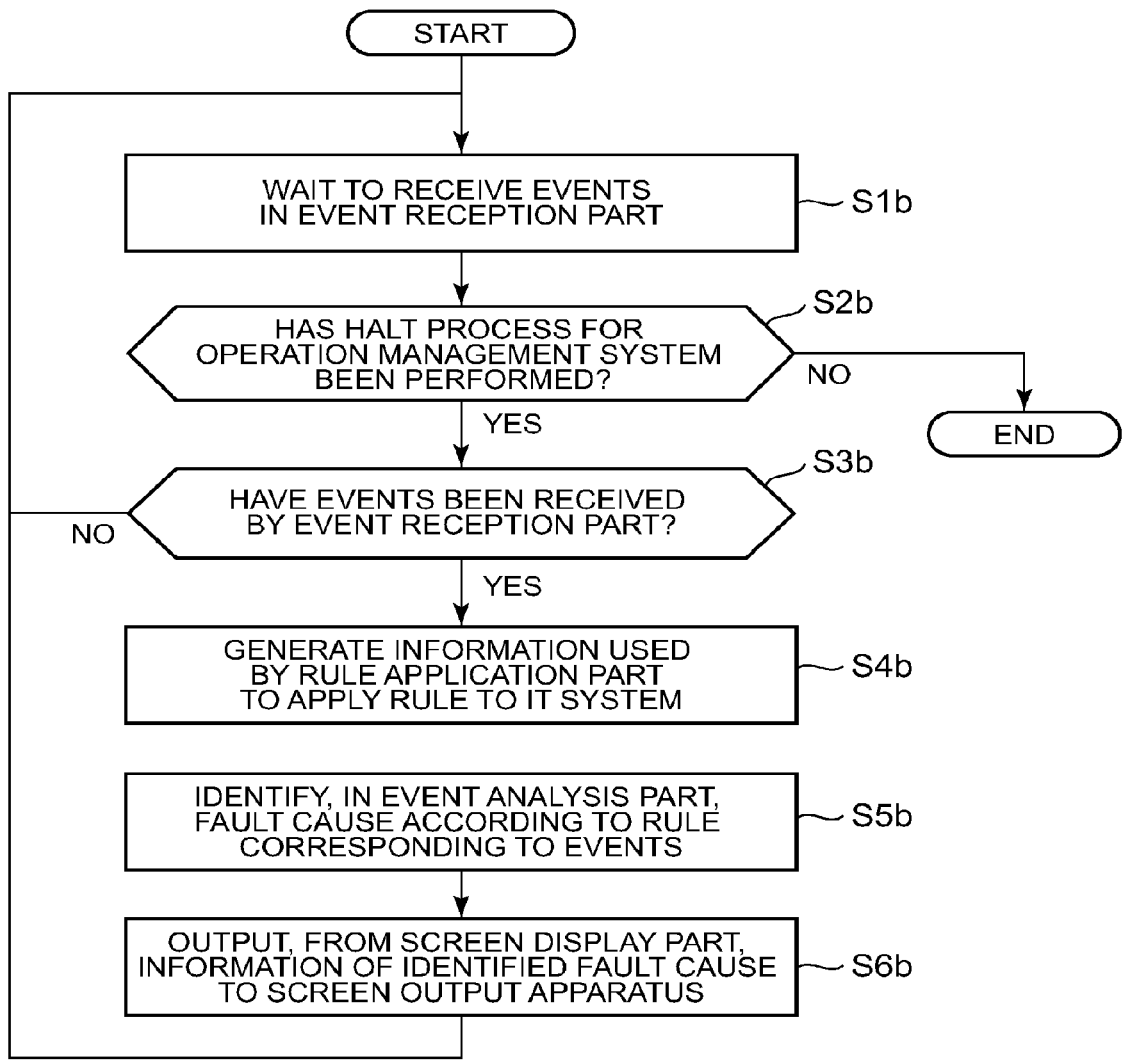
FIG. 20 schematically shows an entire processing flow of fault analysis, in a second embodiment of the present invention.

In a second embodiment of the present invention, the processing procedure of the entire fault-analysis processing flow shown in FIG. 2 in the first embodiment is performed in a manner such that Step S4b of generating application information in the rule application part C11 is performed after Step S3b of receiving events and before Step S5b of event analysis processing performed in the event analysis part C12, as shown in FIG. 20.

The only difference between the first embodiment and the second embodiment is the timing of generating rule application information.

As described above, even when the timing for rule application information is changed and the present invention is implemented, the advantages are still provided and a message indicating that a non-management-target IT apparatus is the root cause apparatus of a fault can be displayed on the screen.

According to the first and second embodiments, described in the specification of this application, a program that implements, in the system management server which has the processor and the memory and which is coupled to a plurality of information processing apparatuses and the screen output apparatus, analysis of events occurring in the plurality of information processing apparatuses includes a part or all of the following processes.

(a) A configuration information storing process of storing identification information of a server apparatus which is included in the plurality of information processing apparatuses and which is an access target of each of the plurality of information processing apparatuses in order to use a network service as a client, in configuration information held by the memory.

(b) A registration process of registering a plurality of monitored apparatuses which are included in the plurality of information processing apparatuses and from which the system management server obtains event information, in the configuration information held by the memory.

(c) A rule storing process of storing in the memory, when an event that includes a first event type related to the network service and an event that includes a second event type related to the network service, different from the first event type, both occurring in the plurality of information processing apparatuses are detected, correlation analysis rule information indicating that an event corresponding to the first event type can occur due to an event corresponding to the second event type.

(d) An event storing process of storing in the memory, a plurality of pieces of the event information obtained from the plurality of monitored apparatuses.

(e) An event information identifying process of identifying first event information which includes the first event type from among the plurality of pieces of the event information stored in the memory, based on the correlation analysis rule information.

(f) A cause identifying process of identifying, based on the configuration information, a first monitored apparatus which is one of monitored apparatuses that have sent the first event information and a fault cause apparatus which serves as a server apparatus for the first monitored apparatus in the network service corresponding to the first event type.

(g) An analysis result sending process of sending, when the fault cause apparatus is not included in the plurality of monitored apparatuses based on the correlation analysis rule information and the configuration information, information identifying the first monitored apparatus, the first event type, the fault cause apparatus, and the second event type to the screen output apparatus, thereby causing the screen output apparatus to display a message indicating that an event corresponding to the first event information that occurred in the first monitored apparatus is estimated to be caused by the fact that an event of the second event type occurred in the fault cause apparatus.

Further, the correlation analysis rule information may include topology condition information indicating a topology condition between a first information processing apparatus which is one of the plurality of information processing apparatuses and in which the first event type has occurred and a second information processing apparatus which is one of the plurality of information processing apparatuses and in which the second event type has occurred; and the fault cause apparatus may be identified based on the topology condition information in the cause identifying step. Through this process, it is possible to present estimation only for an information processing apparatus that is actually used by an information processing apparatus in which an event has occurred, thereby providing a higher level of convenience for the user of the system management server.

The system management server may further include the following processes.

(h) A related-apparatus identifying process of identifying an event-related information processing apparatus which is a server apparatus for the plurality of monitored apparatuses and which is included in the plurality of information processing apparatuses but is not included in the plurality of monitored apparatuses, based on the correlation analysis rule information and the configuration information.

(i) An event-information acquisition permission/inhibition checking process of checking whether event information can be obtained from the event-related information processing apparatus.

(j) An event-information-acquisition-target addition proposing step of sending, when event information can be obtained from the event-related information processing apparatus as a result of the checking, information identifying the event-related information processing apparatus to the screen output apparatus, thereby causing the screen output apparatus to display a message indicating that event information can be obtained from the event-related information processing apparatus.

Through those processes, registration into the system management server can be promoted without failing to perform registration, quickly after event monitoring with the system management server is newly required or allowed because of a change in a management method or in the administrator of an information processing apparatus.

Further, the event-information acquisition permission/inhibition checking process may be performed based on a result obtained when the system management server accesses, according to a predetermined procedure, an information processing apparatus that is included in the plurality of information processing apparatuses and that has an IP address included in an IP address range specified in advance as a checking range. In order to avoid unauthorized accesses or fraudulent attacks to an information processing apparatus (in particular, a server computer accessed via the Internet), accesses from the outside to this information processing apparatus are monitored in some cases. When an access is made by this checking process, the access may also be recognized as an unauthorized access or a fraudulent attack, by the access monitoring. Therefore, the range of IP addresses of information processing apparatuses that are obviously not targets of event monitoring or the range of IP addresses of information processing apparatuses that can be targets of event monitoring is identified, thereby suppressing such a communication that is falsely recognized as an unauthorized access or a fraudulent attack.

Further, the fault cause apparatus may be a storage apparatus which has a controller and provides a logical volume; the network service may be a service providing the logical volume by a block access protocol (such as FibreChannel or iSCSI); and the first event type may be the occurrence of a fault in the storage apparatus and the first event type may be a fail in accessing the logical volume.

Further, the fault cause apparatus may be a computer which provides a DNS as the network service, the first event type may be a fail in requesting a DNS, and the first event type may be a disconnection of communication with a DNS server.

Further, the fault cause apparatus may be a file server computer which has an NIC to receive data from at least one of the plurality of information processing apparatuses and which provides a stored file for at least one of the plurality of information processing apparatuses; the network service may be a network file-sharing service for sharing the file stored by the file server computer; and the first event type may be the occurrence of a fault in the file server (for example, the occurrence of a fault in the NIC, the occurrence of a failure in software executed by the processor held by the file server, or the occurrence of a fault in which the communication function of the file server is stopped), and the first event type may be a fail in accessing the file provided by the network file-sharing service.

Further, when the fault cause apparatus is one of the plurality of monitored apparatuses based on the correlation analysis rule information and the configuration information, second event information which includes the second event type and which has been obtained from the fault cause apparatus may be identified from among the plurality of pieces of the event information; and information identifying the first monitored apparatus, the first event information, the fault cause apparatus, and the second event information may be sent to the screen output apparatus, thereby causing the screen output apparatus to display a message indicating that an event corresponding to the first event information that occurred in the first monitored apparatus was caused by an event corresponding to the second event information that occurred in the fault cause apparatus.

Further, the first information processing apparatus may be a computer, and the second information processing apparatus may be a storage apparatus; and the topology condition information may include a combination of communication identification information corresponding to the computer and communication identification information corresponding to the storage apparatus, the combination indicating a connection relation of a topology in which the computer is coupled to the storage apparatus. Note that at least one of an iSCSI name, an IP address, and a WWN used in FibreChannel is a candidate for the communication identification information.

Further, the first information processing apparatus may be a computer, and the second information processing apparatus may be a file server computer which provides a stored file for the plurality of information processing apparatuses by a file-sharing service; and the topology condition information may include a combination of communication identification information corresponding to the computer, and communication identification information corresponding to the file server computer or an export name used to make the file available, the combination indicating a connection relation of a topology in which the computer is coupled to the file server computer.

Further, the first information processing apparatus may be a computer, and the second information processing apparatus may be a DNS server computer which provides a DNS, as a network-sharing service, for the plurality of information processing apparatuses; and the topology condition information may include a combination of communication identification information corresponding to the computer and communication identification information corresponding to the DNS server computer, the combination indicating a connection relation of a topology in which the computer is coupled to the DNS server computer. Note that an IP address or an FQDN is a candidate for each of the communication identification information corresponding to the computer and the communication identification information corresponding to the DNS server computer.

Furthermore, the system management server may be configured by one or more computers.

What is claimed:

1. A system comprising:
a plurality of information processing apparatuses; and
a management computer,
wherein the management computer stores correlation analysis rule information, indicating that an event of a second event type is a root cause of an event of a first event type for a network service,
wherein the management computer stores configuration information including at least information about the network service of a plurality of monitored apparatuses,
wherein the plurality of monitored apparatuses are included in the plurality of information processing apparatuses,
wherein the management computer obtains event information from the plurality of monitored apparatuses,
wherein the management computer identifies, from the event information, a first event of the first event type,
wherein the management computer identifies a first monitored apparatus in which the first event occurs, and
wherein the management computer identifies a root cause apparatus which is a server of the network service, based on the correlation analysis rule information and the configuration information, even if the root cause apparatus is not included in the plurality of monitored apparatuses.

2. The system according to claim 1, wherein the management server selects the plurality of monitored apparatuses, each of the plurality of monitoried apparatuses having an IP (Internet Protocol) address in a predetermined IP address range.

3. The system according to claim 1,
wherein the root cause apparatus is a storage apparatus,
wherein the network service provides a logical volume of the storage apparatus, and
wherein the second event type is an occurrence of a fault in the storage apparatus, and the first event type is a failure of accessing the logical volume by a computer.

4. The system according to claim 1,
wherein the root cause apparatus is a DNS (Domain Name Service) server,
wherein the network service is a DNS,
wherein the second event type is a fault in the DNS server, and
wherein the first event type is a disconnection of communication for a DNS.

5. The system according to claim 1,
wherein the root cause apparatus is a file server computer,
wherein the network service is a file sharing service,
wherein the second event type is a fault in the file server computer, and
wherein the first event type is an access failure of a file provided by the file sharing service.

6. The system according to claim 1, wherein the management computer identifies the first monitored apparatus, the first event type, the root cause apparatus, and the second event type, and sends information identifying the first monitored apparatus, the first event type, the root cause apparatus, and the second event type to the screen output apparatus for displaying a root cause of the first event of the first event type that occurred in the first monitored apparatus and is estimated to be caused by a not obtained event of the second event type that occurred in the root cause apparatus.

7. The system according to claim 2, wherein the management computer suggests obtaining event information from the root cause apparatus, after checking whether or not the management server is able to obtain information from the root cause apparatus.

8. A management computer comprising:
a memory storing a management program; and
a CPU (Central Processing Unit) that executes the management program,
wherein when executed, the management program causes the CPU to:
store correlation analysis rule information, indicating that an event of a second event type is a root cause of an event of a first event type for a network service;
store configuration information including at least information about the network service of a plurality of monitored apparatuses;
obtain event information from the plurality of monitored apparatuses;
identify, from the event information, a first event of the first event type;
identify a first monitored apparatus in which the first event occurs; and
identify a root cause apparatus which is a server of the network service, based on the correlation analysis rule information and the configuration information, even if the root cause apparatus is not included in the plurality of monitored apparatuses.

9. The management computer according to claim 8, wherein the management program further causes the CPU to select the plurality of monitored apparatuses, each of the plurality of monitored apparatuses having an IP (Internet Protocol) address in a predetermined IP address range.

10. The management computer according to claim 8,
wherein the root cause apparatus is a storage apparatus,
wherein the network service provides a logical volume of the storage apparatus, and
wherein the second event type is an occurrence of a fault in the storage apparatus, and the first event type is a failure of accessing the logical volume by a computer.

11. The management computer according to claim 8,
wherein the root cause apparatus is a DNS (Domain Name Service) server,
wherein the network service is a DNS,
wherein the second event type is a fault in the DNS server, and
wherein the first event type is a disconnection of communication for a DNS.

12. The management computer according to claim 8,
wherein the root cause apparatus is a file server computer,
wherein the network service is a file sharing service,
wherein the second event type is a fault in the file server computer, and
wherein the first event type is a access failure of a file provided by the file sharing service.

13. The management computer according to claim 8,
wherein the management program further causes the CPU to: identify the first monitored apparatus, the first event type, the root cause apparatus, and the second event type; and
send information identifying the first monitored apparatus, the first event type, the root cause apparatus, and the second event type to the screen output apparatus for displaying a root cause of the first event of the first event type that occurred in the first monitored apparatus and is estimated to be caused by a not obtained event of the second event type that occurred in the root cause apparatus.

14. The management computer according to claim 9, wherein the management computer suggests obtaining event information from the root cause apparatus, after checking whether or not the CPU is able to obtain information from the root cause apparatus.

15. A non-transitory machine-readable storage medium tangibly embodying a program for execution on a management computer, the program comprising code causing the management computer to:
    store correlation analysis rule information, indicating that an event of a second event type is a root cause of an event of a first event type for a network service;
    store configuration information including at least information about the network service of a plurality of monitored apparatuses;
    obtain event information from the plurality of monitored apparatuses;
    identify, from the event information, a first event of the first event type;
    identify a first monitored apparatus in which the first event occurs; and
    identify a root cause apparatus which is a server of the network service, based on the correlation analysis rule information and the configuration information, even if the root cause apparatus is not included in the plurality of monitored apparatuses.

16. The non-transitory machine-readable storage medium according to claim 15, wherein the program further causes the management computer to select the plurality of monitored apparatuses, each of the plurality of monitored apparatuses having an IP (Internet Protocol) address in a predetermined IP address range.

17. The non-transitory machine-readable storage medium according to claim 15,
    wherein the root cause apparatus is a storage apparatus,
    wherein the network service provides a logical volume of the storage apparatus, and
    wherein the second event type is an occurrence of a fault in the storage apparatus, and the first event type is a failure of accessing the logical volume by a computer.

18. The non-transitory machine-readable storage medium according to claim 15,
    wherein the root cause apparatus is a DNS (Domain Name Service) server,
    wherein the network service is a DNS,
    wherein the second event type is a fault in the DNS server, and
    wherein the first event type is a disconnection of communication for a DNS.

19. The non-transitory machine-readable storage medium according to claim 15,
    wherein the root cause apparatus is a file server computer,
    wherein the network service is a file sharing service,
    wherein the second event type is a fault in the file server computer, and
    wherein the first event type is a access failure of a file provided by the file sharing service.

20. The non-transitory machine-readable storage medium according to claim 15, wherein the program causes the management computer to identify the first monitored apparatus, the first event type, the root cause apparatus, and the second event type, and send information identifying the first monitored apparatus, the first event type, the root cause apparatus, and the second event type to the screen output apparatus for displaying a root cause of the first event of the first event type that occurred in the first monitored apparatus and is estimated to be caused by a not obtained event of the second event type that occurred in the root cause apparatus.

21. The non-transitory machine-readable storage medium according to claim 16, wherein the program causes the management computer to suggest obtaining event information from the root cause apparatus, after checking whether or not the management computer is able to obtain information from the root cause apparatus.

* * * * *